United States Patent [19]

Sakurai

[11] Patent Number: 5,200,837
[45] Date of Patent: Apr. 6, 1993

[54] DIGITAL COPIER INCLUDING MEANS FOR ERASING DIGITAL IMAGE DATA OVER A GIVEN AREA, ESPECIALLY SUITABLE FOR PREVENTING JAMMING OF PAPER

[75] Inventor: Tetsuo Sakurai, Sagamihara, Japan

[73] Assignee: Ricoh Company, Ltd., Japan

[21] Appl. No.: 515,708

[22] Filed: Apr. 27, 1990

[30] Foreign Application Priority Data

| Apr. 30, 1989 | [JP] | Japan | 1-110763 |
| May 24, 1989 | [JP] | Japan | 1-130663 |
| May 24, 1989 | [JP] | Japan | 1-130665 |
| Nov. 10, 1989 | [JP] | Japan | 1-292999 |
| Feb. 16, 1990 | [JP] | Japan | 2-35475 |

[51] Int. Cl.$^5$ .............. H04N 1/00; H04N 1/387; G03G 21/00
[52] U.S. Cl. .................. 358/401; 358/453; 355/218
[58] Field of Search .......... 358/400, 401, 448, 452, 358/453, 464; 355/218

[56] References Cited

U.S. PATENT DOCUMENTS

| 3,834,807 | 9/1974 | Fuller et al. | 355/218 |
| 4,743,947 | 5/1988 | Yamamoto | 355/218 |
| 4,866,533 | 9/1989 | Nagashima | 358/464 |
| 4,945,386 | 7/1990 | Ito et al. | 355/218 |

Primary Examiner—Edward L. Coles, Sr.
Assistant Examiner—Thomas D. Lee
Attorney, Agent, or Firm—Mason, Fenwick & Lawrence

[57] ABSTRACT

A digital copier for recording image data representative of a document image on a paper sheet by digitally processing the image data and capable of forming a blank area in a leading edge portion of the paper sheet to prevent the sheet from wrapping round a fixing roller. Digital image data representative of a document image is erased over a predetermined area in a subscanning direction, while the erasing area is variable depending on positive-negative reversal/non-reversal. The blanking control area is varied in response to the number of black pixels included in the image data and to conditions particular to a paper sheet used. Black pixels included in the digital data are counted in matching relation to the reversal/non-reversal, whereby a blank area in a leading edge portion of a paper sheet is controlled. When the reversal is not effected, the blank area in a leading edge portion is controlled on the basis of the number of black pixels; when it is effected, the blank area is controlled on the basis of the number of white pixels. The blank area is varied on the basis of the number of black pixels and the conditions of a paper sheet, while the omission of the image in the leading end portion is controlled in association with the amount of image.

10 Claims, 21 Drawing Sheets

DIGITAL COPIER INCLUDING MEANS FOR ERASING DIGITAL IMAGE DATA OVER A GIVEN AREA, ESPECIALLY SUITABLE FOR PREVENTING JAMMING OF PAPER

BACKGROUND OF THE INVENTION

The present invention generally relates to digital copier for recording image data representative of a document by digitally processing the image data and, more particularly, to a digital copier capable of forming a blank area in a leading edge portion of a paper sheet to prevent the sheet from wrapping around a fixing roller.

It is a common practice with a copier implemented by an electrophotographic process to charge the surface of an image carrier in the form of a photoconductive element, expose the charged surface to image data representative of a document to electrostatically form a latent image on the element, develop the latent image, transfer the resultant visible image to a paper sheet, and then fix the image transferred to the paper sheet. To fix the image on the paper sheet, it has been customary to use a fixing device having a fixing roller in which a heater or similar heat source is incorporated and a pressin roller. The paper sheet carrying the image thereon is transported to the fixing device and, after the image has been fixed by the device, driven out of the copier.

When a paper sheet carrying an image in a leading edge portion thereof is transported to a nipping region between the two coactive rollers of the fixing device by a belt, for example, the leading edge portion adheres to the surface of the fixing roller due to the pressure being exerted by the pressing roller on the fixing roller and the heat being generated by the heat source. Then, the paper sheet wraps round the fixing roller and cannot be driven out of the copier, thereby jamming the fixing device. Especially, when the image in the leading edge portion of the paper sheet is a solid black image, for example, it is heated by the heater at the nipping section between the rollers with the result that the developer forming the image melts. Although the melted developer solidifies when the paper sheet moves through the nipping section, it contracts to some extent so that the leading edge portion of the paper sheet is curled to coil round the fixing roller. So long as the curl is not noticeable, a separating pawl having a tip remaining in contact with the fixing roller will successfully separate the paper sheet and will prevent it from wrapping round the roller. However, when the solid image in the portion of interest of the paper sheet has a substantial area, the curl is noticeable. This, coupled with the fact that the developer plays the role of adhesive sticking the paper sheet to the fixing roller, the pawl fails to separate such a portion of the paper sheet from the roller because the force urging the pawl against the roller is only weak enough to prevent the pawl from damaging the surface of the roller.

In the light of the above, it has been customary to form a blank area in a leading edge portion of a paper sheet so that the sheet may be prevented from wrapping round the fixing roller. With a prior art analog copier, two different approaches are available for forming a blank area in a leading edge portion of a paper sheet. One of them is to cause a discharge lamp or similar erasing means to erase, before image transfer, a latent image formed on a photoconductive element and lying in a leading edge portion of an image area which is associated with the size of a paper sheet. The other is to delay the operation of an image transferring device relative to a leading edge portion of a developed image formed on a photoconductive element so as not to transfer the image to a leading edge portion of a paper sheet.

Assume that the erasing means scheme is applied to a positive-positive (P/P) copier. Then, a charging unit deposits a negative charge, for example, on a photoconductive element. In this condition, the photoconductive element is exposed imagewise so that a latent image is electrostatically formed on the element in the area other than the exposed area, i.e., the area where the negative charge has been dissipated. A developing roller supplies a positively charged toner, or developer, to the latent image to develop it. Specifically, an image area is left on the photoconductive element as a high potential area. Hence, when the image area is illuminated, its image potential is erased to leave a blank area on a paper sheet.

In the case of negative-positive (N/P) image formation which is customary with an ordinary digiral copier, a negative charge, for example, is deposited on the photoconductive element. Then, the photoconductive element is exposed imagewise. The developing roller applies a negatively charged toner to the resultant area on the element where the negative charge has been dissipated, producing a toner image on the element. This sets up a low potential in the image area and a high potential in the other or non-image area. Hence, when the leading edge portion of a paper sheet is discharged by a discharge lamp or similar erasing means, it turns out to be a solid black image and, therefore, aggravates the wrapping of the paper sheet round a fixing roller. Another problem with the erasing means scheme is that a paper sheet cannot be surely prevented from coiling round a fixing roller unless a substantial blank area is left on a paper sheet, due to the irregularities in the timing for starting forming a toner image, the turn-off timing of discharge processing, the register timing of a paper sheet and a toner image.

The other or delayed transfer type scheme mentioned previously executes the transfer processing in a particular transfer region within the transferring device and not in a predetermined portion of the photoconductive element. This brings about a problem that the non-transferred area varies with the amount of toner deposited on the photoconductive element and, hence, it is difficult to form a blank area accurately on a paper sheet. Specifically, the blank area is apt to vary in position in the main scanning direction. In addition, the toner remaining non-transferred on the photoconductive element increases the load on a cleaning device more than necessary. For example, when an image includes a solid black portion, it is likely that the solid black portion prevents the cleaning device from exhibiting its expected cleaning function.

Furthermore, such a prior art procedure blanks a predetermined area of a leading edge portion of a paper sheet without exception, so that even hairlines and characters lying in the predetermined area are erased despite that they do not cause the paper sheet to wrap round the fixing roller. Assume that after the photoconductive element has been exposed imagewise, the charge deposited on the element and associated with a leading edge portion of a paper sheet is erased unconditionally over 5 mm, for example, by erasing means with no regard to the content of image data. Then, blank processing is automatically executed even with hairlines and similar image portions whose image area density (total amount of black pixels in overall area; less than 10% in ordinary documents) is less than 2% or 3%, despite that such images do no cause a paper sheet to wrap round the fixing roller at all. As a result, even the characters or similar image portions are erased to produce an incomplete reproduction.

The wrapping of a paper sheet round the fixing roller is effected not only by the condition of a leading edge portion of a paper sheet but also by the thickness, material and straining direction of the paper sheet. For example, a thin paper sheet which is little elastic is apt to easily wrap round the fixing roller even if its image area density is low. Conversely, a thick paper sheet having sufficient rarely wraps round the fixing roller although its image area density may be high.

Especially, a digital copier having a N/P reversal capability cannot surely prevent a paper sheet from coiling round the fixing roller when implemented by the prior art method which unconditionally blanks a paper sheet over 5 mm, for example. This is because even when the image area density of a positive document is as low as 2% to 3%, an image produced by reversal is equivalent to a document whose image area density is as high as 97% to 98%. Conversely, when use is made of a negative document the image area density of which is 95% to 98%, the N/P reversal reduces the image area density to only 2% to 3%. Then, despite that blanking a leading edge portion of a paper sheet is not necessary, the leading edge portion is also blanked unconditionally over 5 mm, for example.

Moreover, since irregularities in the operation timing of the erasing means has to be taken into consideration, the required amount is erasure is greater than a minimum necessary amount.

SUMMARY OF THE INVENTION

It is therefore an object of the present invention to provide a digital copier which forms a blank are accurately in a leading edge portion of a paper sheet to prevent the paper sheet from wrapping round a fixing roller, thereby freeing a fixing device from paper jams.

It is another object of the present invention to provide a digital copier which changes the blanking area of a paper sheet depending on the image condition of a leading edge portion of a paper sheet and the conditions of the paper sheet itself, thereby preventing the paper sheet from wrapping round a fixing roller and, yet, preserving image data to be reproduced in a leading edge portion of a paper sheet and which does not have to be blanked.

It is another object of the present invention to provide a digital copier which changes the blanking area depending on whether or not N/P reversal is effected to thereby prevent a paper sheet from coiling round a fixing roller while preserving image data to be reproduced in a leading edge of a paper sheet and which does not have to be blanked.

It is another object of the present invention to provide a digital copier which reduces the irregularities of a blank area and forms only a minimum necessary blank area.

It is another object of the present invention to provide a generally improved digital copier.

In accordance with the present invention, a digital copier for transferring an image formed on a photoconductive element by digitally processing a document image to a paper sheet and fixing the image on the paper sheet comprises an image reading device for converting the document image into a multi-level density signal by a photoelectric conversion device, a converting device for converting the multi-level density signal from the image reading device into digital image data, a storing device for storing the digital image data from the converting device an image forming device for reading the digital image data out of the storing device to form an image based on the image data on the photoconductive element, a transferring device for transferring the image formed by the image forming device to the paper sheet being transported, and an erasing device for erasing the digital image data over a predetermined are in a subscanning direction.

Also, in accordance with the present invention, a digital copier for transferring an image formed on a photoconductive element by digitally processing a document image to a paper sheet and fixing the image on the paper sheet comprises an image reading device for converting the document image into a multi-level density signal by a photoelectric conversion device, a converting device for converting the density signal from the image reading device into digital image data, a storing device for storing the digital image data from the converting device, an image forming device for reading the digital image data out of the storing device to form an image based on the digital image data, an erasing device for erasing the digital image data over a predetermined area in a subscanning direction when the image forming device forms an image, a shifting device for shifting the digital image data in position in the subscanning direction when the digital image data is read out of the storing device, a shift setting device for setting an amount of shift by which the image data is to be shifted by the shifting device, and a transferring device for transferring the image formed by the image forming device to a paper sheet being transported. The amount of erasure by which the digital image data is to be erased in a leading edge portion of the image by the erasing device is varied on the basis of the amount of shift of the digital image data determined by the shift setting device.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
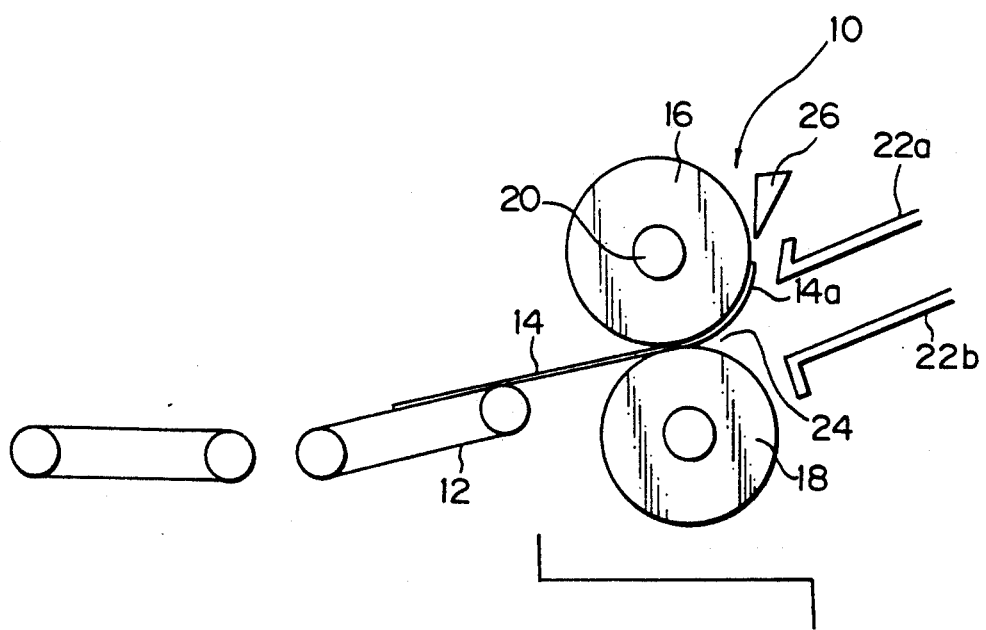
FIG. 1 is a schematic view demonstrating how a prior art copier causes a paper sheet undergone image transfer to wrap round a fixing roller.

To better understand the present invention, a brief reference will be made to a prior art digital copier, shown in FIG. 1. As shown, the prior art copier has a fixing device 10 and a transport belt 12 for transporting a paper sheet 14 to the fixing device 10. The fixing device 10 is comprised of a fixing roller 16 having a heater or similar heat source 20 therein and a pressing roller 18 coactive with the fixing roller 16. Assuming that the paper sheet 14 carries an image in a leading edge portion 14a thereof, the leading edge portion 14a adheres to the surface of the fixing roller 16 due to the pressure being exerted by the pressing roller 18 on the fixing roller 16 and the heat being generated by the heat source 20. Then, the paper sheet 14 wraps round the fixing roller 16 and cannot be driven toward guide plates 22a and 22b, thereby jamming the fixing device 10. Especially, when the image in the leading edge portion 14a of the paper sheet 14 is a solid black image, for example, it is heated by the heater 20 at a nipping region 24 between the rollers 16 and 18 with the result that the developer forming the image melts. Although the melted developer solidifies when the paper sheet 14 moves through the nipping section 24, it contracts to some extent so that the leading edge portion 14a of the paper sheet 14 is curled to coil round the fixing roller 16. So long as the curl is not noticeable, a separating pawl 26 having a tip 26a remaining in contact with the fixing roller 16 will successfully separate the paper sheet 14 and will prevent it from wrapping round the roller 16. However, when the solid image in the leading edge portion 14a of the paper sheet 14 has a substantial area, the curl is noticeable. This, coupled with the fact that the developer plays the role of adhesive sticking the paper sheet 14 to the fixing roller 16, the pawl 26 fails to separate the leading edge portion 14a from the roller 16 because it is simply held in contact with the roller 16 by a force weak enough to prevent the surface of the roller 16 from being damaged.

In the light of the above, it has been customary to form a blank area in the leading edge portion 14a of the paper sheet 14 so that the paper sheet 14 may be prevented from wrapping round the fixing roller 16. With a prior art analog copier, two different approaches are available for so blanking the leading edge portion 14a of the paper sheet 14. One of them is to cause a discharge lamp or similar erasing means to erase, before image transfer, a latent image formed on a photoconductive element and lying in a leading edge portion of an image area which is associated with the size of a paper sheet. The other is to delay the operation of an image transferring device relative to the leading edge portion of a developed image formed on a photoconductive element so as not to transfer the image to a paper sheet.

Figure 2:
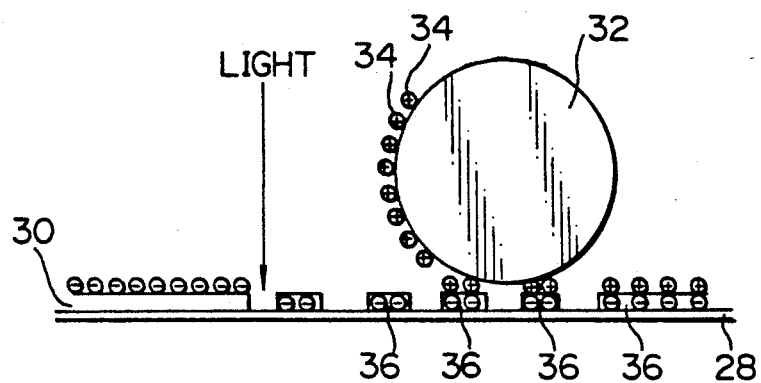
FIG. 2 is a view schematically showing a charging, exposing and developing sequence particular to a P/P copier.

As shown in FIG. 2, assume that the erasing means scheme is applied to a P/P copier. Then, a charging unit, not shown, deposits a negative charge 30, for example, on a photoconductive element 28. Then, the photoconductive element 28 is exposed imagewise so that a latent image is electrostatically formed on the element 28 in the area other than the exposed area, i.e., the area where the negative charge 30 has been dissipated. A developing roller 32 supplies a positively charged toner, or developer, 34 to the latent image to develop it. Specifically, an image area 36 is left on the photoconductive element 28 as a high potential area. Hence, when the image area 36 is illuminated, its image potential is erased to leave a blank area on a paper sheet.

Figure 3:
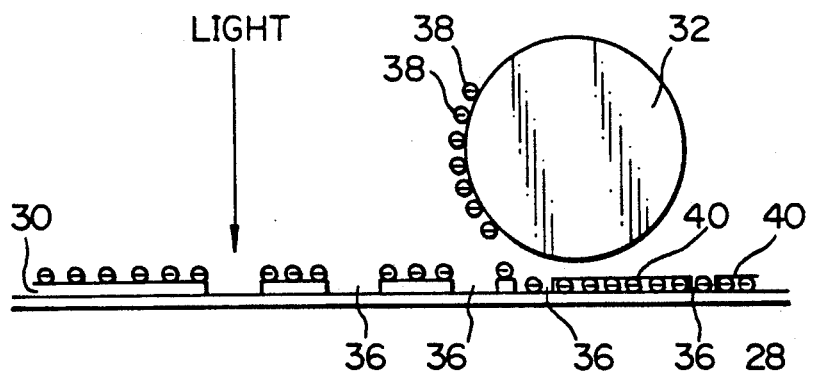
FIG. 3 is a view similar to FIG. 2, schematically showing a charging, exposing and developing sequence particular to a N/P copier.

As shown in FIG. 3, in the case of N/P image formation which is customary with an ordinary digital copier, a negative charge 30, for example, is deposited on the photoconductive element 28. The photoconductive element 28 is exposed imagewise. The developing roller 32 applies a negatively charged toner 38 to the resultant area on the element 28 where the negative charge 30 has been dissipated, producing a toner image on the element 28. This sets up a low potential in the image area 36 and a high potential in the other or non-image area 40. Hence, when the leading edge portion of a paper sheet is discharged by a discharge lamp or similar erasing means, it turns out to be a solid black image and, therefore, wraps round a fixing roller more easily. Another problem with the erasing means scheme is that a paper sheet cannot be surely prevented from wrapping round a fixing roller unless a substantial blank area is left on a paper sheet, due to the irregularities in the timing for starting forming a toner image, the turn-off timing of discharge processing, the register timing of a paper sheet and a toner image.

The delayed image transfer scheme has various problems left unsolved, as discussed previously. Specifically, it is difficult to form a blank area accurately in the leading edge portion of a paper sheet. When a paper sheet carries a solid black image in its leading edge portion, it increases the load acting on a cleaning device to invite incomplete cleaning. Even when the image carried on the leading edge portion of a paper sheet is a hairline, character or similar image which will rarely cause the leading edge portion to wrap round a fixing roller, it is unconditionally blanked resulting in an incomplete reproduction.

A preferred embodiment of the digital copier in accordance with the present invention will be described with reference to the accompanying drawings.

[1] General Construction of Digital Copier

Figure 4:
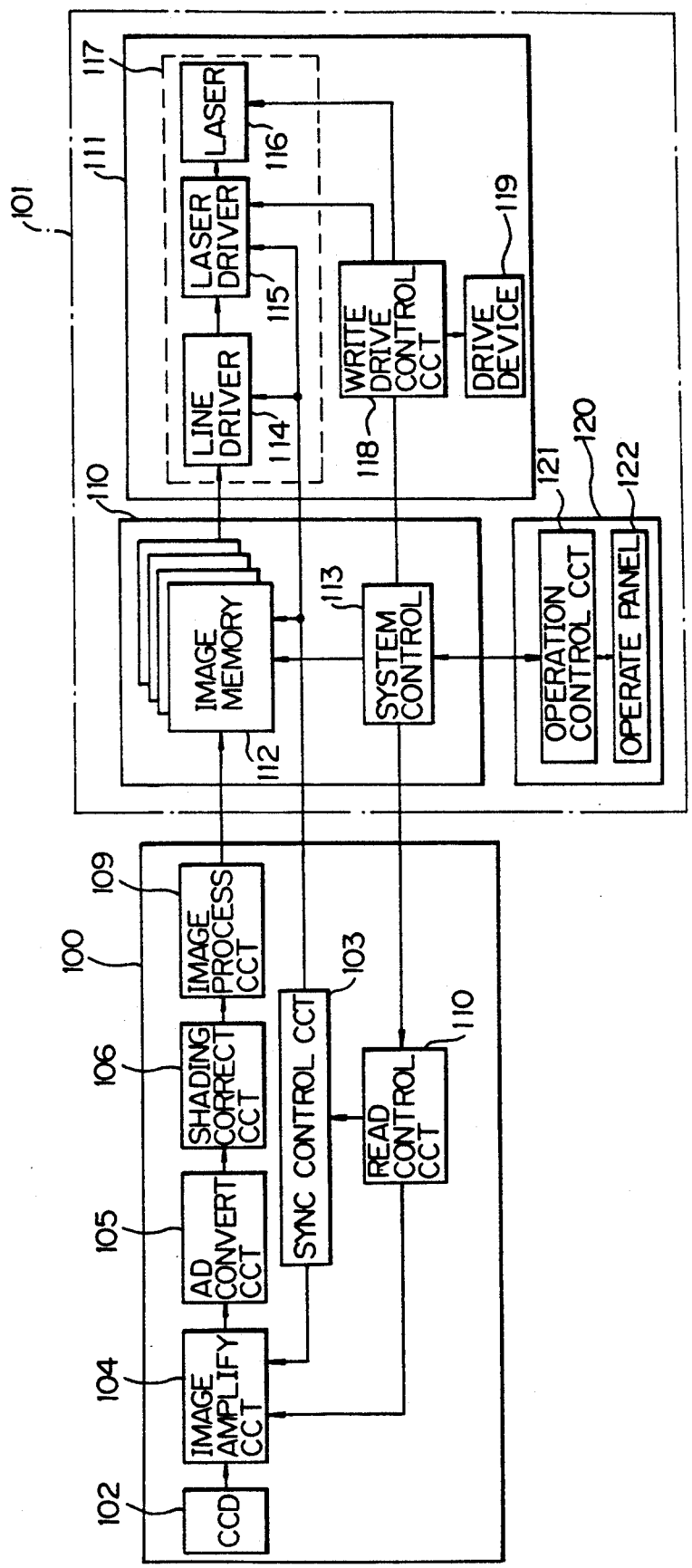
FIG. 4 is a block diagram schematically showing the general construction of a digital copier embodying the present invention.

Referring to FIG. 4, the general construction of a digital copier embodying the present invention is shown. As shown, the copier is generally made up of a reading device 100 for reading information printed on a document by optically scanning the document, and a copying device 101 for storing the information read by the reading device 100 and executing copying processing on the basis of the stored information, or data.

The reading device 100 has an imaging device (CCD) 102 for reading information carried on a document. A synchronization (sync) control circuit 103 generates a clock which is synchronous to an analog signal or document data which the CCD 102 produces. An image amplifying circuit 104 amplifies the analog signal produced by the CCD 102. An analog-to-digital (AD) converting circuit 105 converts the analog signal amplified by the amplifying circuit 104 into multi-level digital image data on a pixel basis. A shading correction circuit 106 compensates for distortions particular to the digital image data and ascriable to the decrease in the quantity of light in a peripheral portion caused by a lens, not shown, the irregular distribution of light, the contamination of a glass platen, not shown, the irregular sensitivity distribution of the CCD 102, etc. An image processing circuit 109 transforms the compensated digital image data into digital recording image data. A read control circuit 110 supervises such various sections of the reading device 100.

The copying device 101 has an image data storing device 110 for storing the digital recording image data fed from the image processing circuit 109 therein. A copying circuit 111 executes a sequence of copy processing on the basis of the digital image data stored in the storing device 110. An operating device 120 is accessible for entering instructions at the outside of the copier. The image data storing section 110 is composed of an image memory 112 having a plurality of page memories, and a system control 113 for feeding control signals to the image memory 112 in response to instructions from various sections so as to control the write-in and read-out of image data from the writing device 117 having a line driver 114, a laser driver 115 writing device 117 having a line driver 114, a laser driver 115 and a laser 116, a write drive control circuit 118 for controlling write processing, and a driving device 119. The operating device 120 is comprised of an operation control circuit 121 for controlling operation instructions, and an operation board 122 accessible for entering copying conditions such as a desired magnification change ratio, paper size and number of copies.

[2] Construction of Image Memory I

A specific construction of the image memory 112 will be described with reference to FIG. 5. As shown, the image memory 112 has a serial-to-parallel (SP) converter 200 for converting two image data signals 1 and 2 fed from the image processing circuit 109 of the reading device 100 into parallel data. A memory block 201 stores the parallel image data from the SP converter 200 therein. A timing control 202 controls the write-in and read-out of the image data from the memory block 201. A parallel-to-serial (PS) converter 203 transforms the image data read out of the memory block 201 into serial data. An AND gate circuit 204 is interconnected to the PS converter 203 for controlling the output of image data so as to control blank processing. An Exclusive-OR (EXOR) gate circuit 205 is interconnected to the AND gate 204 to effect P/N reversal. A control 206 supervises the operations of the timing control 202, AND gate circuit 204, and EXOR gate circuit 205. A toggle buffer 207 is implemented by a plurality of RAMs. An address control 208 is interconnected to the toggle buffer 207 for governing the addresses of the RAMs.

[3] First Blanking Operation with Image Memory I

Figure 6:
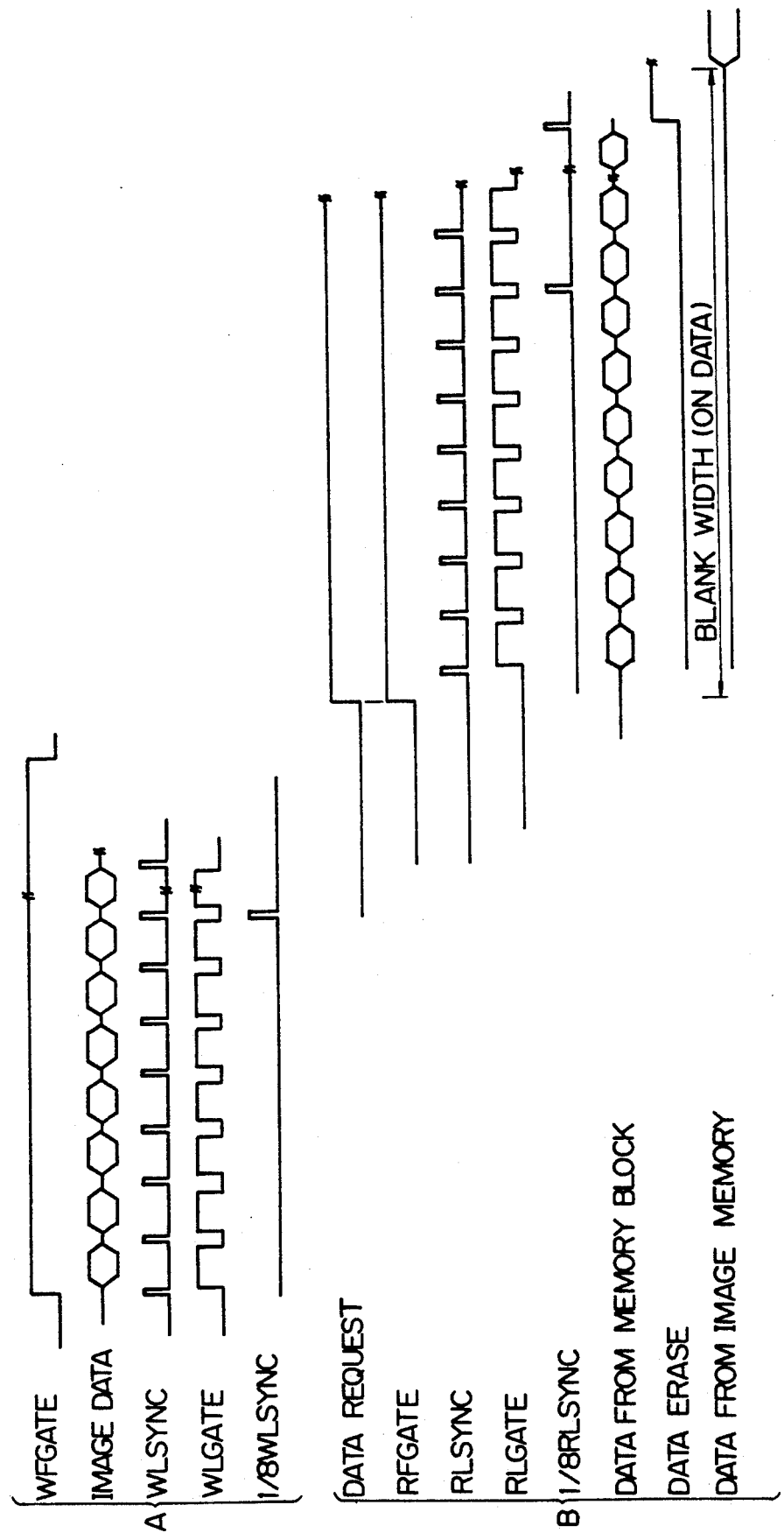
FIG. 6 is a timing chart representative of the operation of the image memory shown in FIG. 5.
Figure 7:
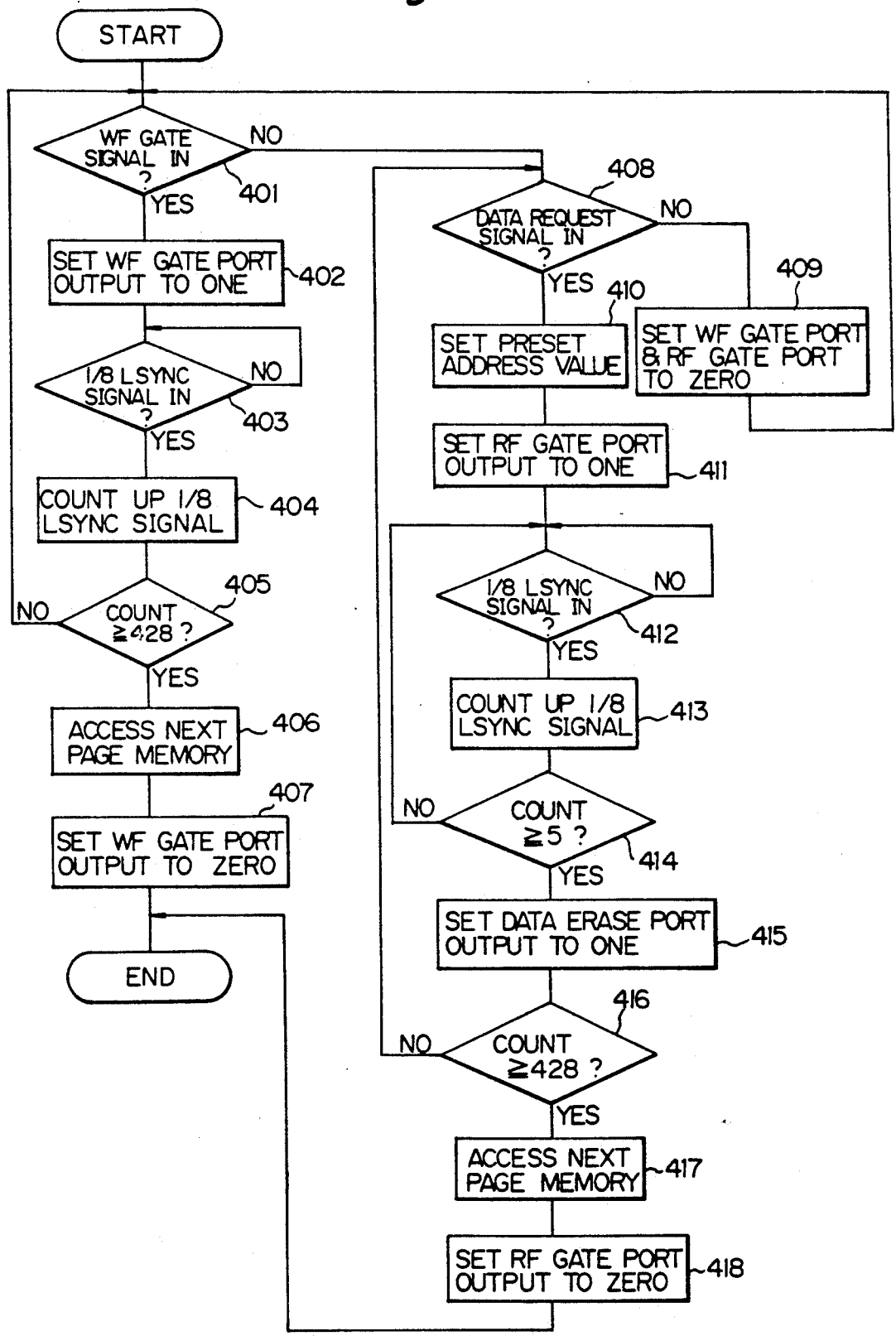
FIG. 7 is a flowchart associated with FIG. 6.

A blanking operation available with the above construction will be described with reference to FIGS. 6 and 7.

[3]-a Writing Image Data to Image Memory

First, how the image data is written to the image memory will be described. After a document, not shown, has been loaded on a glass platen, light issuing from a light source, not shown, scans the document in a main scanning direction. A reflection from the document is focused onto the CCD 102 via optics, not shown, which includes a lens. The CCD 102 outputs the document image in the form of an analog signal synchronous to the clock which is generated by the sync control circuit 103. The analog signal is amplified by the image amplifying circuit 104. The AD converting circuit 105 converts the amplified analog image signal into a multi-level digital image signal on a pixel basis. The resulted digital image data is applied to the shading correction circuit 106 which then compensates for the previously mentioned distortions of the image data. The compensated output of the shading correction circuit 106 is transformed into digital recording image data by the image processing circuit 109. The digital recording image data is fed to the image data reading device 110 to be written to the image memory 112.

The digital recording image data is read out of the image memory 112 and then subjected to predetermined processing. Then, as the system control 113 delivers an instruction in response to an operation signal from the operating section 120, the digital recording image data is transformed into a laser beam by the copying circuit 111 via the line driver 114, laser driver 115 and laser 116 which are controlled by the write drive control circuit 118.

Figure 5:
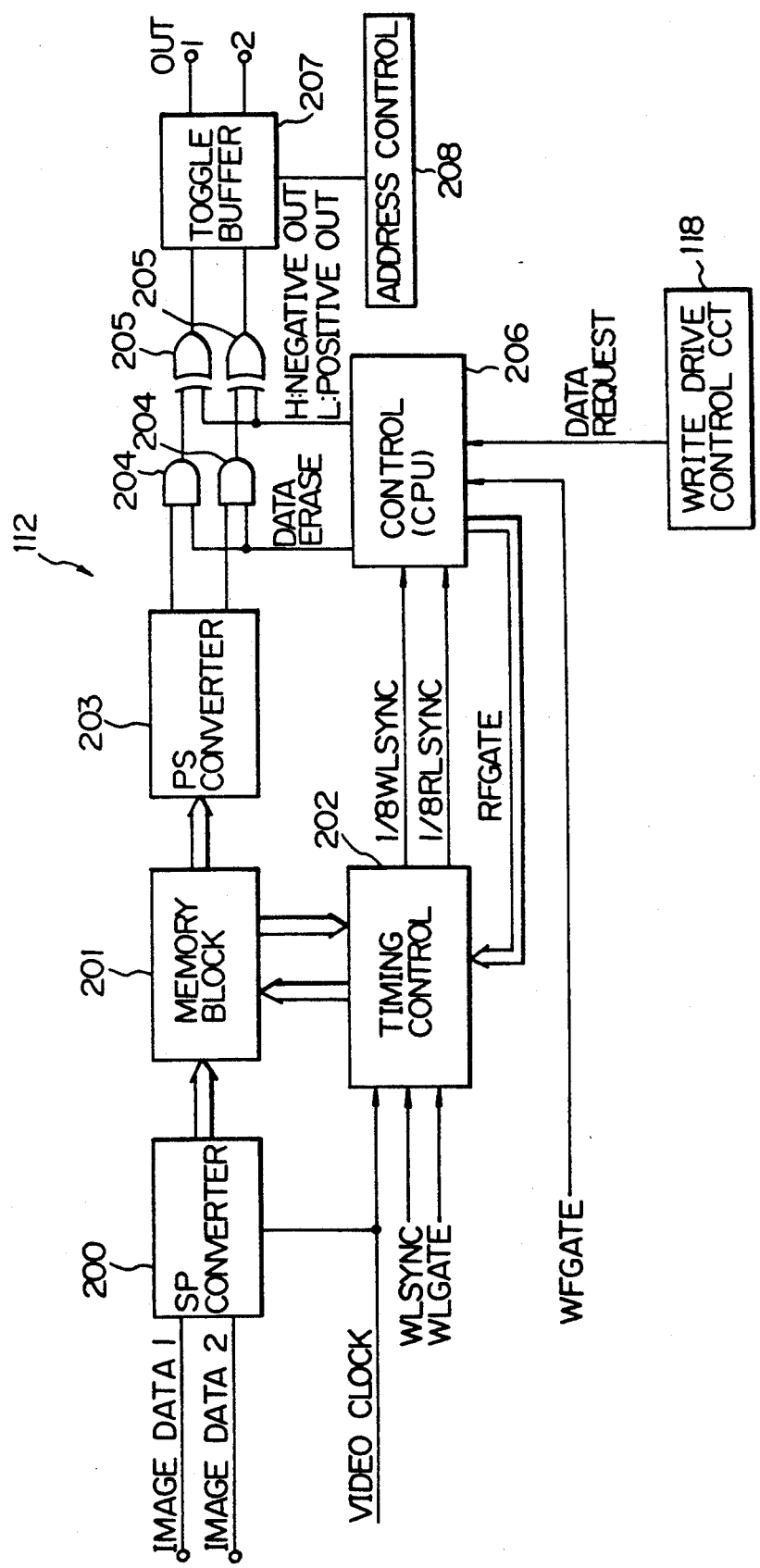
FIG. 5 is a block diagram schematically showing a specific construction of an image memory of the illustrative embodiment.

As shown in FIG. 5, one line of digital image recording signal from the image processing circuit 109 of the reading device 100 is delayed for the purpose of lowering the pixel frequency at the time of data transfer. This allows two lines of data to be transferred in a period of time associated with two lines. Hence, the digital image recording signal is outputted as image data 1 and 2 in synchronism with a video clock whose frequency is 16 MHz and applied to the SP converter 200 to be converted into parallel data. The parallel data are written to thirty-two memories of the memory block 201 at a time in synchronism with an address clock which is produced by dividing the video clock by 32. The timing control 202 controls such write-in of parallel data in response to the video clock signal, a frame gate signal (WF gate signal) adapted for write-in, a write line gate signal (WL gate signal) representative of the width of one line of video clock, and a pulse-like write line sync signal (WL sync signal) having a width of eight clock pulses and rising sixteen clock pulses before the WL gate signal in order to set up the timing of the latter. The memory block 201 is implemented by sixty-four 1- megabit DRAMs thirty-two of which are assigned to the image data 1 and the rest is assigned to the image data 2. The total capacity of the memory block 201 is 67,108,864 bits in terms of the number of pixels. The timing control 202 generates a ⅛ WL sync signal by dividing the WL sync signal by 8 and delivers it to the control 206. The ⅛ WL sync signal appears once for eight consecutive pulses of the WL sync signal and has an interval corresponding to about 1 mm as measured in the subscanning direction. The control 206 sees the image data writing condition to the memory block 201 by counting the ⅛ WL sync signals. For example, when the control 206 counts 100 ⅛ WL sync signals, the image data will have been written to the memory block 201 over about 100 mm. Waveforms A shown in FIG. 6 are representative of the WF gate, image data signal, WL sync signal, WL gate signal, and ⅛ WL sync signal. When the control 206 counts 428 ⅛ WL sync signals, the memory block 201 is substantially full so that any further writing operations are inhibited and the next page memory is used.

Specifically, in the event of a writing operation, the control 206 determines whether or not the WF gate signal has arrived (step 401). If the answer of the step 401 is NO, the program is transferred to a reading procedure. If the answer of the step 401 is YES, the output on an WF gate signal port turns from (logical) ZERO to (logical) ONE (402). Then, the control 206 determines whether or not the ⅛ WL sync signal has arrived (403). If the answer of the step 403 is YES, the control 206 starts counting the ⅛ WL sync signals (404). Subsequently, the control 206 determines whether or not the number of the ⅛ WL sync signals has reached "428"(405). If the answer of the step 405 is NO, the program returns to the beginning determining that the page memory of interest is not full. If the answer of the step 405 is YES, the control 206 determines that the page memory is full and accesses the next page memory (406). Thereafter, the output on the WF gate signal port turns to ZERO (407) to terminate the writing operation to the memory block 201.

[3]-b Reading Image Data and Controlling Blanking of Leading Edge Portion

The circuitry shown in FIG. 5 reads out image data and controls the blanking of the leading edge portion of the data, as follows.

After a document has been loaded and a copy start key has been pressed, a paper sheet, not shown, is fed at a predetermined timing from a paper tray, not shown, which has been selected on the operation board of the operating device 120. As soon as a register sensor, no shown, which precedes a register roller, not shown, senses the leading edge of the paper sheet, the write drive control circuit 118 of the copying circuit 111 counts a timing clock being generated thereinside and, after a delay necessary for the register, sends a data request signal to the control 206 of the image memory 110. When the control 206 sees the arrival of the data request signal (408), it sets a preset address data value (410). If the answer of the step 408 is NO, the outputs on the WF gate signal port and RF gate signal port become ZERO (409) and the program returns to the beginning. After the preset address value has been set, the output on the RF gate signal port turns from ZERO to ONE (411) so that the control 206 delivers an RF gate signal to the timing control 202. In response, the timing control 202 latches the instantaneous preset address data value fed from the control 206 and thereby determines an address for starting reading the image data out of the memory block. The preset address data value is sent as a 17-bit signal, and an address is selected on a 1 mm basis on the memory in the subscanning direction. Such control is used chiefly when an image shift is executed to change the copying position in the subscanning direction. Specifically, when an image is to be advanced on a paper sheet by 100 mm in an intended direction paper feed, 306×100 data in decimal notation will be converted into hexadecimal data to produce preset data.

As stated above, the memory block 201 is switched from a write mode to a read mode in response to the RF gate signal. As a result, thirty-two bits of parallel data are read out of the page memory of the memory block 201. The parallel image data are then reconverted by the PS converter 203 into serial image data and, in synchronism with the 16 MHz video clock, applied to the control 206. Simultaneously with the read processing, the controller 206 determines whether or not a ⅛ RL sync signal from the timing controller 202 has arrived (412) and supervises the read-out by counting the ⅛ RL sync signals. As stated above, the timing control 202 generates ⅛ sync signals whose interval corresponds to 1 mm as during the writing operation, and delivers them to the control 206. The control 206 uses these signals as the basis of a data erase signal which will be described. The image data converted into serial image data by the SP converter 203 is coupled to one input terminal of the AND gate circuit 204. Coupled to the other input terminal of the AND gate circuit 204 is the data erase signal which the control 206 generates.

At the instant when the control 206 has fed the RF gate signal to the timing 202, the starts counting the ⅛ RL sync signals (each corresponding to 1 mm) (413). When the control 206 counts five ⅛ sync signals (414), the output on a data erase port turns from ZERO to ONE (415). This switches over the output to "H" so that the data erase signal is fed to the AND gate 204 to cause the latter to produce the image data. Stated another way, no image data are produced from the AND gate circuit 204 until five ⅛ RL sync signals have been counted. Therefore, no image data are outputted on a paper sheet, i.e., the paper sheet is simply left blank over 5 mm as measured from the leading edge thereof. The relationship of the various signals mentioned above to each other is represented by waveforms B in FIG. 6.

Assuming that the read-out processing has begun at the address O, the read-out from one page memory is inhibited when 428 ⅛ RL sync signals are counted (416) and the next page memory is accessed (417). Subsequently, the output on the RF gate signal port turns to ZERO (418) to terminate the read-out of image data and the blanking control.

[4] Second Blanking Operation with Image Memory I

The EXOR gate circuit 205, FIG. 5, serves as a N/P reversal gate. The digital copier is provided with a N/P reversing function thereinside. Either a negative output or a positive output is selectable on the operation board 122 of the operating device 120. Specifically, a negative or a positive output is produced when the output signal of the control 206 is "H" or "L". When the control 206 delivers "H" to the EXOR gate circuit 205 to set up a negative output mode, the count of the ⅛ RL sync signals (each corresponding to 1 mm) in the control 206 is automatically changed from "5" to "8" in order to inhibit the AND gate circuit 204 from outputting the image data until the count reaches "8". In this case, therefore, the paper sheet will be left blank over 8 mm as measured from the leading edge thereof.

Figure 8:
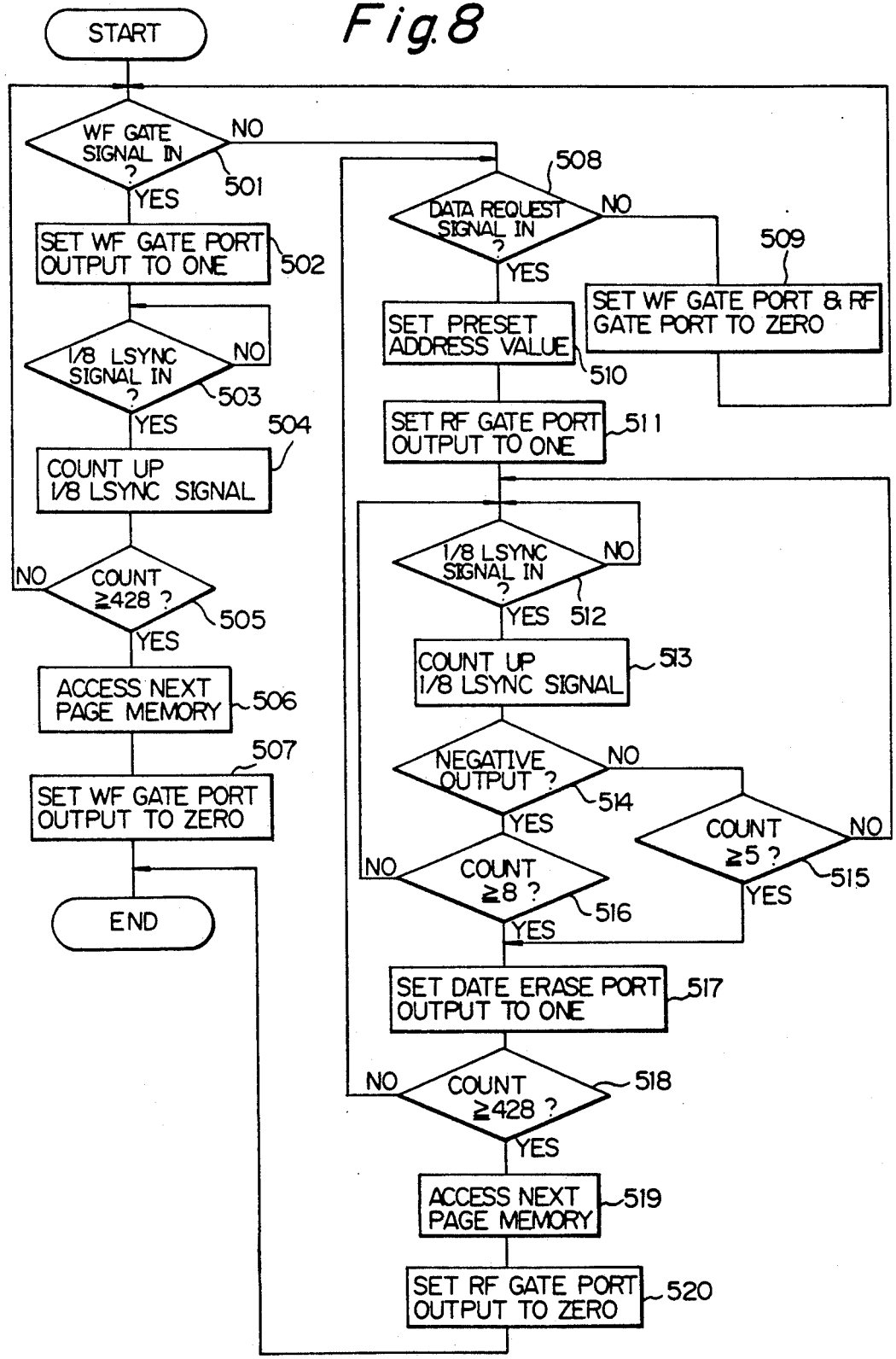
FIG. 8 is a flowchart demonstrating another specific operation available with the image memory of FIG. 5.

Such a procedure will be described with reference to FIG. 8. Since the procedure of FIG. 8 is almost the same as that of FIG. 7, only the steps particular to FIG. 8 will be described. In a step 513 corresponding to the step 413 of FIG. 7, the control 206 starts counting ¼ L sync signals and, at the same time, determines whether or not the EXOR gate circuit 205 is to produce a negative output (514). If the answer of the step 514 is NO, the control 206 determines whether or not the count of the ¼ RL sync signals (each corresponding to 1 mm) has reached "5" (515). If the answer of the step 514 is YES, the control 206 automatically changes the predetermined count of the ¼ RL signals from "5" to "8" and determines whether or not the count has reached "8" (516). As a result, no image data are outputted from the AND gate circuit 204 until the count reaches "8".

The output of the EXOR gate circuit 205 is fed to the toggle buffer 207. The address control 208 interconnected to the toggle buffer 207 serves various functions such as determining the amount of image shift in the main scanning direction, effecting UP-DOWN switchover for forming a mirror image by down-counting the RAM addresses, and setting a preset address value. The output of the toggle buffer 207 is fed as the output image data 1 and 2 to the writing device 117 of the copying circuit 111 and thereby reproduced on a paper sheet.

[5] Construction of Image Memory II

Figure 9:
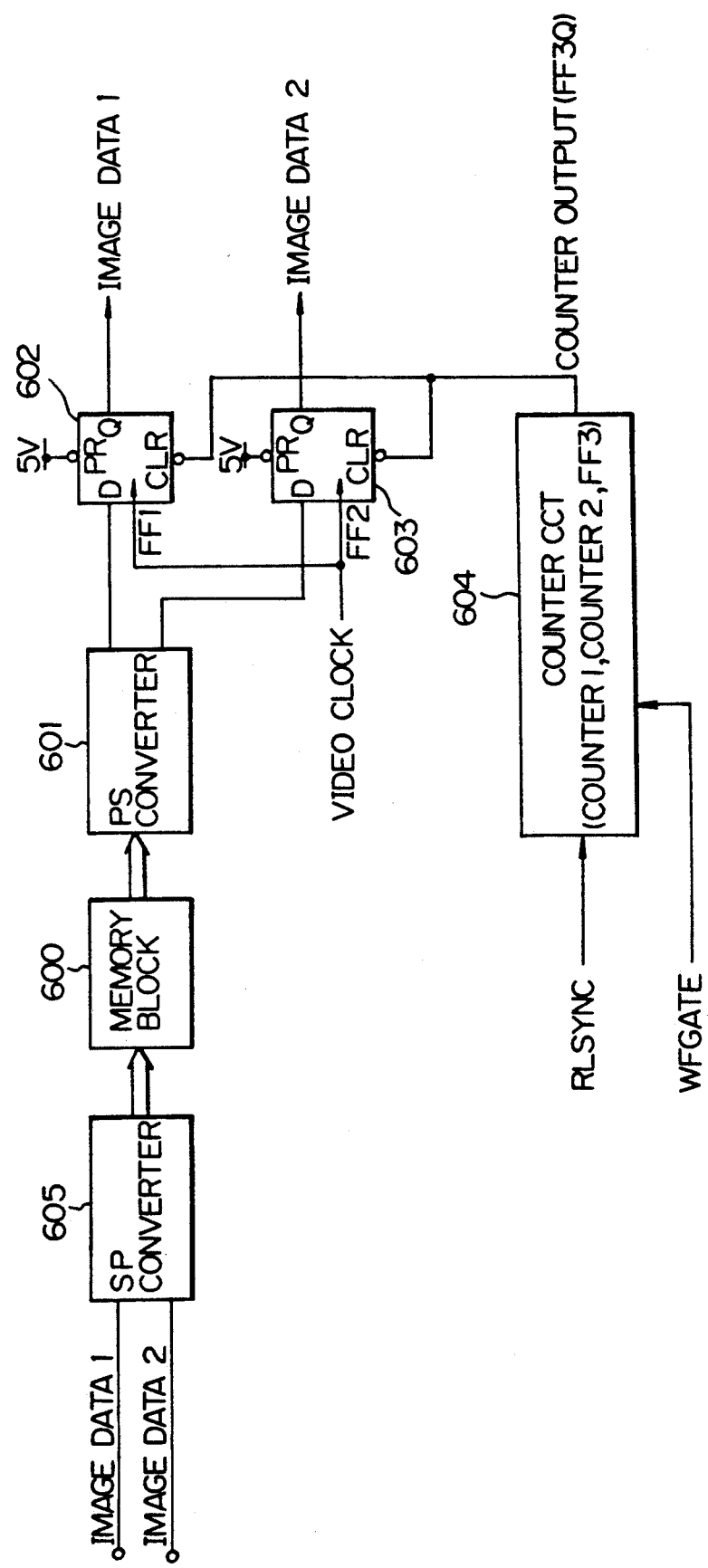
FIG. 9 is a block diagram schematically showing another specific construction of the image memory of the embodiment.
Figure 10:
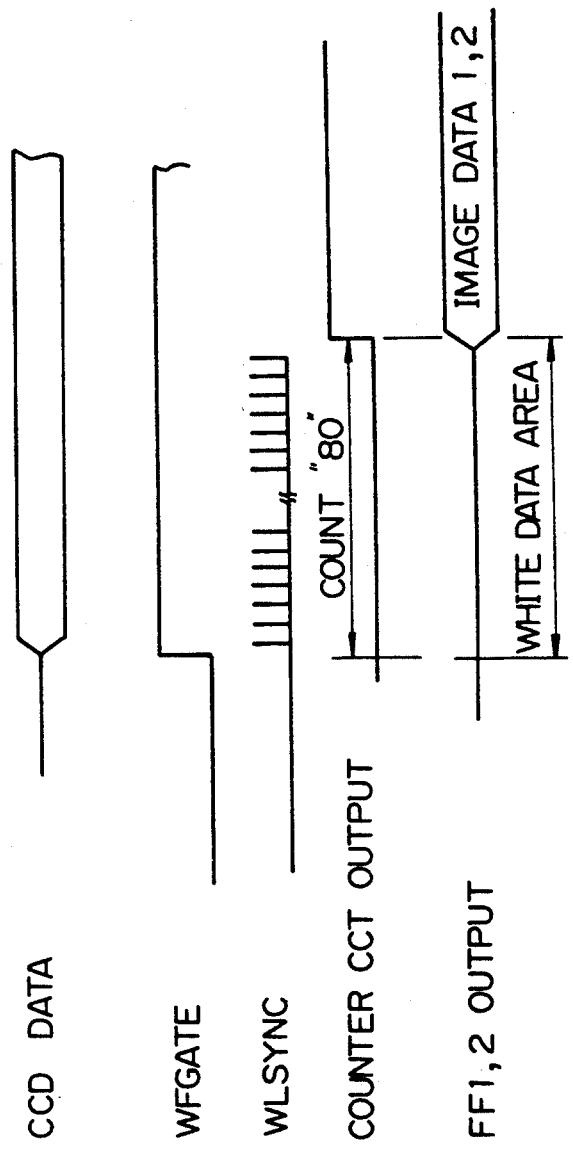
FIG. 10 is a timing chart useful for understanding the operation of the image memory of FIG. 9.

Another specific construction of the image memory 112 will be described with reference to FIGS. 9 and 10. The alternative construction has flip-flop circuits in place of the AND gate circuit 204 of the previous construction. As shown in FIG. 9, the two image data signals 1 and 2 from the image processing circuit 109 of the reading device 100 are transformed into parallel data by an SP converter 605. A memory block 600 stores the parallel data outputted by the SP converter 605. A PS converter 601 converts the image data read out of the memory block 600 into serial data. Two flip-flop circuits 602 and 603 control the output of the image data for a blanking control purpose. A counter circuit 604 controls the flip-flop circuits 602 and 603 by counting the RL sync signals and WF gate signals.

[6] Blanking Operation with Image Memory II

In the above construction, the image data 1 and 2 are transformed into parallel signals by the SP converter 605 and then written to a predetermined memory of the memory block 600 by the write control which has been described in relation to the first construction of the image memory 122. Thereafter, the image data are read out of the memory block 600, reconverted into serial data by the PS converter 601, and then fed to the flip-flop circuits 602 and 603. When the output (FF3Q) of the counter circuit 604 is "L", the flip-flop circuits 602 and 603 remain inoperative and, therefore, the image data 1 and 2 are not outputted. As soon as the output of the counter 604 changes from "L" to "H", both the flip-flops 602 and 603 become operative and thereby output the image data 1 and 2.

Assume that an arrangement is so made as to switch the output of the counter circuit 604 from "L" to "H" when it counts eighty RL sync signals. Then, no image data are outputted from the flip-flops 602 and 603 over a period of time associated with eighty RL sync signals expires, i.e., a distance of 10 mm. Consequently, a paper sheet is left blank over substantially 10 mm as measured from the leading edge thereof. It is possible, therefore, to leave a paper sheet blank over any desired width by changing the count assigned to the counter circuit 604.

As stated above, the flip-flops 602 and 603 of the alternative construction are essentially the same as the AND gate circuit 204 of FIG. 5 concerning the function.

[7] Construction of Image Memory III

Figure 11:
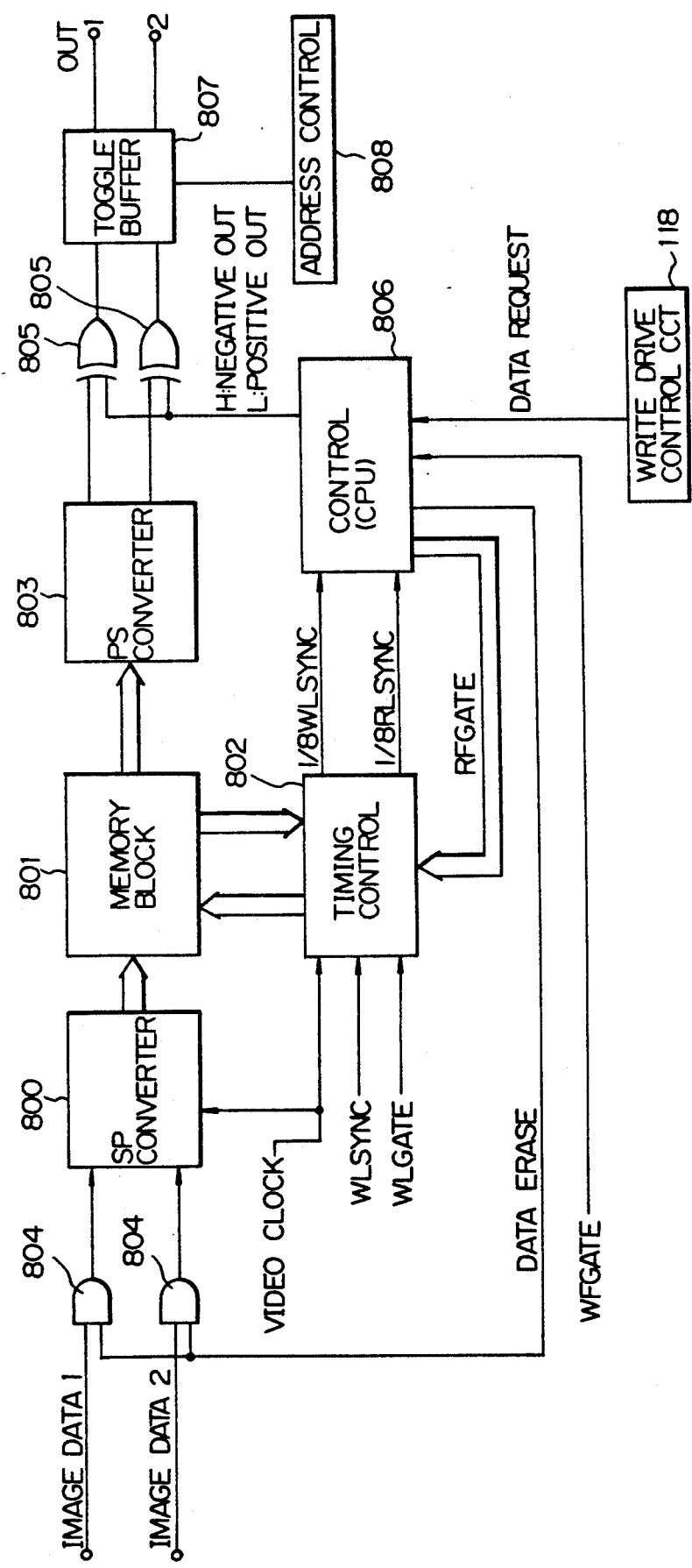
FIG. 11 is a block diagram schematically showing another specific construction of the image memory of the embodiment.
Figure 12:
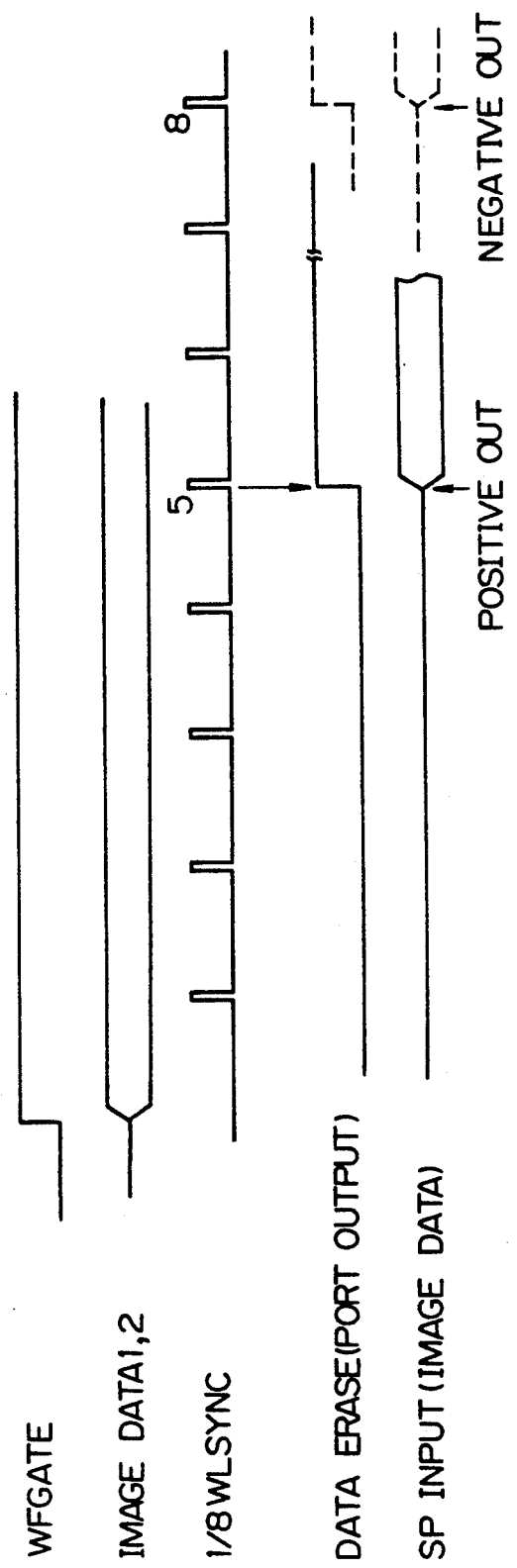
FIG. 12 is a timing chart representative of the operation of the image memory shown in FIG. 11.

Another specific construction of the image memory 122 will be described with reference to FIGS. 11 and 12. This alternative construction is characterized in that an AND gate circuit 804 corresponding to the AND gate circuit 204 of FIG. 5 is located on the image data input side. The rest of the construction is exactly the same as the construction of FIG. 5 and will not be described to avoid redundancy. The arrangement shown in FIG. 11 is successful in erasing data lying in an area to be blanked beforehand at the time of writing.

[8] Timing for Erasing Digital Image data or for Changing Erasing Area

The digital image data may be erased or the area for erasing the image data may be changed after the image data has been read out of the storing means. Then, the blanking width will be determined by counting RL sync signals at the time of read-out, promoting the accuracy of blanking and the simplicity construction. Alternatively, the erasure or the change of the erasing area may be effected by replacing data existing in a leading edge portion of a document with white data when the image reading means reads the document. This allows even a digital copier lacking storing means (memory) to readily form a blank in a leading edge portion of a paper sheet. Further, the erasure or the change of the erasing area may be effected by erasing data lying in a leading edge portion when the digital image data is written to the storing means, thereby implementing accurate blanking.

[9] Construction of Image Memory IV

Figure 13:
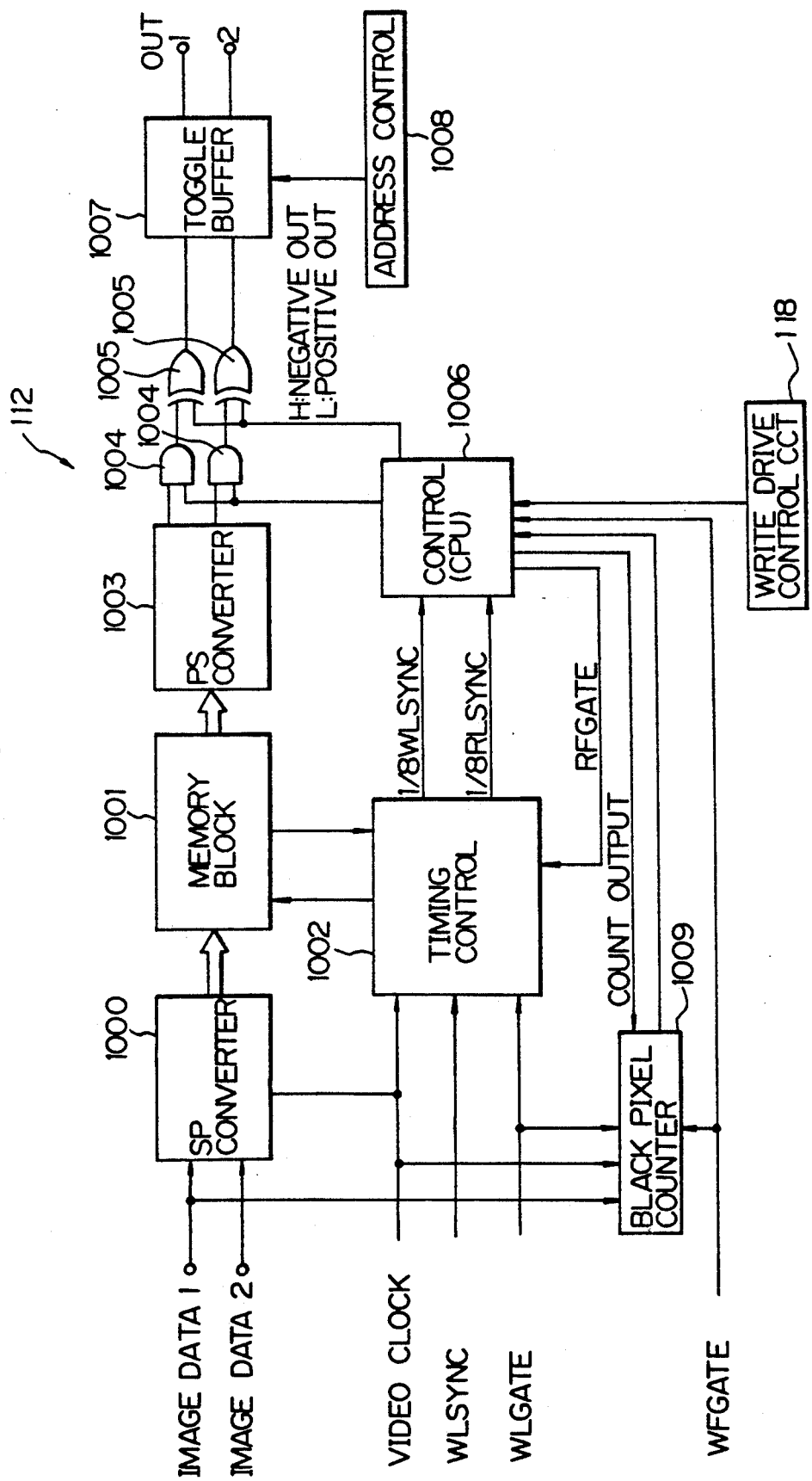
FIG. 13 is a block diagram schematically showing another specific construction of the image memory of the embodiment.

A further specific construction of the image memory 112 is shown in FIG. 13. As shown, the image memory 112 has a SP converter 1000 for converting the two image data signals 1 and 2 fed thereto from the image processing circuit 109 into parallel data. A memory block 1001 stores the parallel image data outputted by the SP converter 1000. A timing control 1002 controls the write-in and read-out of the image data from the memory block 1001. A PS converter 1003 transforms the image data read out of the memory block 1001 into serial data. An AND gate circuit 1004 is interconnected to the PS converter 1003 for controlling the output of the image data for the blanking purpose. An EXOR gate circuit 1005 is interconnected to the AND gate circuit 1004 for implementing P/N reversal. A control 1006 controls the operations of the timing control 1002, AND gate circuit 1004, and EXOR gate circuit 1005. A toggle buffer 1007 is made up of a plurality of RAMs. An address control 1008 is interconnected to the toggle buffer 1007 for supervising the addresses of the RAMs. A black pixel counter 1009 totalizes data associated with black pixels existing in an area of 10 mm as measured from the leading edge of an image in the subscanning direction.

[10] Construction of Black Pixel Counter I

Figure 14:
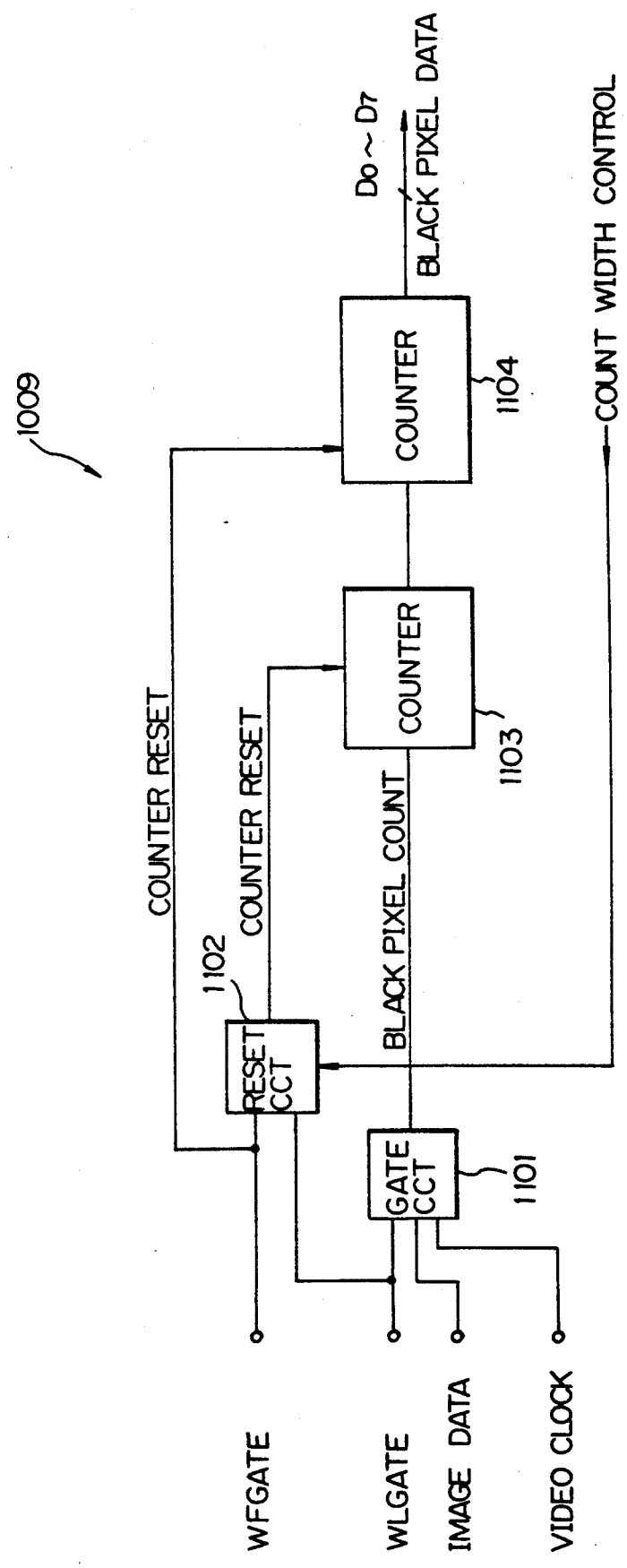
FIG. 14 is a block diagram schematically showing a specific construction of a black pixel counter included in the image memory of FIG. 13.

As shown in FIG. 14, the black pixel counter 1009 has a gate circuit 1101 to which the image data and video clock signal are fed from the image processing circuit 109. A reset circuit 1102 performs a resetting operation in response to the WF gate signal and WL gate signal as well as to a count width control signal from a control 1106. A counter 1103 receives a black pixel count signal from the gate circuit 1101 and a counter reset signal from the reset circuit 1102. A counter 1104 receives a count signal from the counter 1103 and the FR gate signal and delivers a black pixel data signal $D_0$ to $D_7$ to the control (CPU) 1006. In the event of data writing, the black pixel counter 1009 causes the above-mentioned counter to count black pixels existing in a portion of an image extending over 10 mm as measured from the leading edge of the image in the subscanning direction, thereby producing an image area density. The count output (black pixel data) of the black pixel counter 1009 is fed to and stored in the control 1006. At the time of read-out, the amount of a blank to be formed on a paper sheet is controlled via the AND gate circuit 1004.

An arrangement is made such that the output of the black pixel counter 1009 is "1" when the image area density of black pixels is 1% for a paper width of 210 mm (format A4). On pulse of the L gate signal has a width associated with one line in the main scanning direction, i.e., 9,792 pulses or pixels exist which corresponds to 621.8 mm in terms of the width of a paper sheet. Hence, concerning a paper sheet whose width is 210 mm, the number of pixels is:

$$2792 \times (210/621.8) \approx 3300 \text{ (pixels)}.$$

Therefore, the total number of pixels associated with 10 mm is:

$$3300 \times 8 \times 10 = 264,000 \text{ (pixels)}.$$

1% of such a number of pixels is 2,640 pixels.

By counting black pixels over the distance of 10 mm, causing one pulse to appear for every 2,640 black pixels, and causing another counter to count the pulses, as stated above, it is possible to determine the image area density in percentage.

[11] Blanking Operation with Image Memory IV

The operation of the image memory 112 having the above construction will be described with reference to FIGS. 6, 15 and 16. One line of the digital image recording signal from the image processing circuit 109 of the reading device 100 is delayed to reduce the pixel frequency at the time of data transfer, as shown in FIG. 13. Hence, two lines of data are transferred in a period of time associated with two lines. It follows that the digital image recording signal is outputted as the image data 1 and 2 in synchronism with the 16 MHz video clock signal. The SP converter 1000 transforms the digital image recording signal into parallel data. The parallel data are written to thirty-two memories of the memory block 1001 at the same time in synchronism with the address clock which is produced by dividing the video clock by 32. The timing control 1002 controls such a writing operation in response to the video clock, signal WF gate signal adapted for writing, WL gate signal representative of the width of one line of video clock in the main scanning direction, and pulse-like WL sync signal having a width of eight clock pulses and rising sixteen clock pulses before the WL gate signal for setting up the timing of the WL gate signal. The memory block 1001 is implemented by sixty-four 1-megabit DRAMs thirty-two of which are assigned to the image data 1 and the rest is assigned to the image data 2. The total capacity of the memory block 1001 is 67,108,864 in terms of the number of pixels. The timing control 1002 generates the ⅛ WL sync signal by dividing the WL sync signal by 8 and delivers it to the control 1006. The ⅛ WL sync signal has a pulse interval associated with a distance of about 1 mm in the subscanning direction. By counting the ⅛ WL sync signals, the control 1006 sees the image data writing condition to the memory block 1001. For example, when the control 1006 counts 100 ⅛ WL sync signals, the image data will have been written to the memory block 1001 over about 100 mm. The relationship of the WF gate signal, image data signal, WL sync signal, WL gate signal and 1/9 WL sync signal to one another is represented by the waveforms A in FIG. 6. When the count of the ⅛ WL sync signals reaches "428", the control 1006 inhibits any further data from being written to the memory block 1001 because the memory block 1001 is full, and starts writing data in the next page memory.

Specifically, in the event of writing, the control 1006 determines whether or not WF gate signal has arrived (1301). If the answer of the step 1301 is NO, the program is transferred to a reading procedure. If the answer of the step 1301 is YES, the output on the WF gate signal port turns to ONE (1302) and the black pixel counter 1009 counts black pixels included in the image data (1303).

[11]-a Operation of Black Pixel Counter

The operation of the black pixel counter 1009 will be described specifically hereinafter. On the change of the WF gate signal (from "L" to "H") which is a write start signal, the counter 1104 is enabled. Also coupled to the reset circuit 1102, the WF gate signal inverts (from "L" to "H") the output of the reset circuit 1102 in response to the first change in the level of the WL gate signal (from "L" to "H") which is indicative of the fact that an image reading operation is under way. This enables the counter 1103.

Only the pulses associated with the black pixels are outputted by the gate circuit 1101 in synchronism with the video clock and fed to the counter 1103. The counter 1103 produces one pulse every time it counts 2,640 pulses. Such output pulses of the counter 1103 are counted by the counter 1104. In parallel with such an operation, the control 1006 counts the ⅛ WL sync signals (each corresponding to 1 mm). When the number of ⅛ WL sync signals coincides with a distance of 10 mm, the control 1006 swiches over the level of a count width control signal (from "H" to "L") and thereby inverts the output of the reset circuit 1102. As a result, the counter 1103 is disabled and reset. The output of the counter 1104 (black pixel data) is the image area density data and, at this instant, applied to the control 1006.

Figure 15:
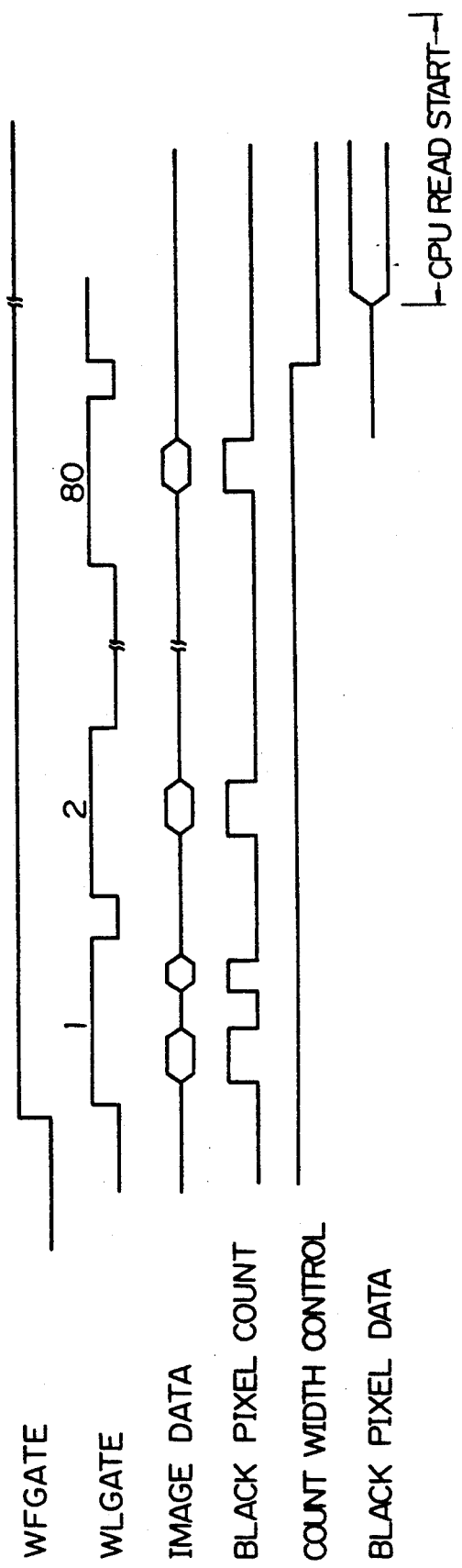
FIG. 15 is a timing chart useful for understanding the operation of the black pixel counter shown in FIG. 14.
Figure 16:
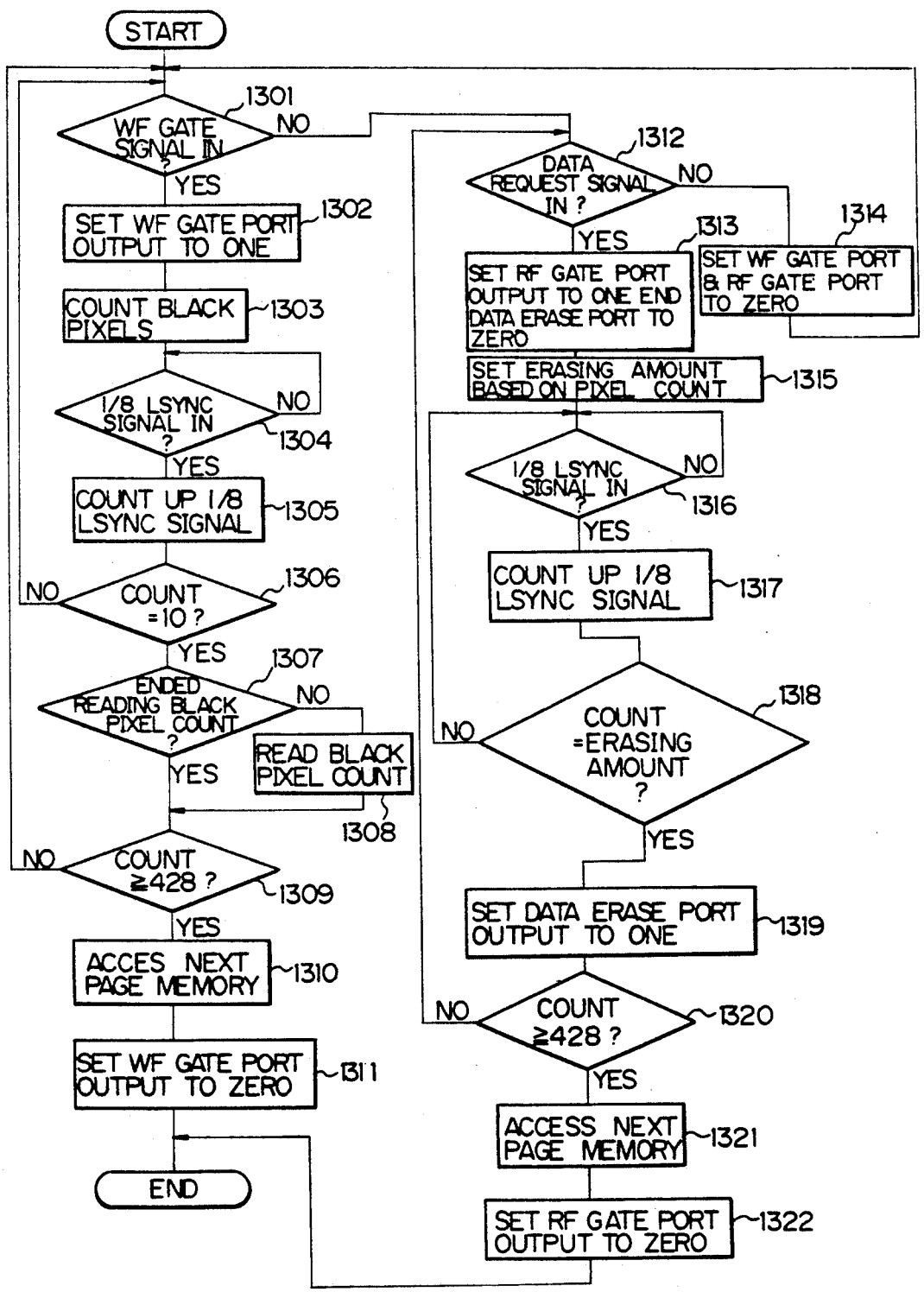
FIG. 16 is a flow chart indicative of the operation of the image memory shown in FIG. 13.

The relationship of the various signals associated with the black pixel counter 15 to one another is shown in FIG. 15.

The count and the amount of data erasure are controlled as shown in Table 1 below.

TABLE 1

| AMOUNT OF ERASURE | COUNT (DOCUMENT: 210 MM WIDE) | COUNT (DOCUMENT: 594 MM WIDE) |
|---|---|---|
| 0 | below 3 H (below 3) | below 9 H (below 9) |
| 3 | 3 H~4 H (3~4) | 9 H~EH (9~14) |
| 5 | 5 H~9 H (5~9) | FH~1 DH (15~29) |
| 8 | above AH (above 10) | above 1 EH (above 30) |

In Table 1, the letter H and the parenthesis are representative of hexadecimal notation and decimal notion, respectively.

The counter 1104 is a binary 8-bit counter and, therefore, capable of counting up to "256" which is associated with 256%. When the paper width is 210 mm, 10 mm contains 264,000 pixels in total. Hence, assuming that all the 264,000 pixels are black pixels, the count is 264000/2640="100". Assuming that the maximum width of documents is 610 mm, then the total number of pixels is about 2.9 times greater and, if all of them are black pixels, the count is "290". Since the maximum count available with the counter 1104 is "256", up to 88% of the image area density can be counted, i.e. 256/290=0.88. Since the image area density is based on the paper width of 210 mm as mentioned above, the image density associated with a paper width of 420 mm is one half the count. Likewise, when the paper width is 594 mm which may be regarded to be approximately three times the width of 210 mm, the image area density will be one-third of the count.

The control 1006 determines whether or not the ¼ WL sync signal has arrived (1304). If the answer of the step 1304 is YES, the control 1006 starts counting the ¼ WL sync signals (1305). Then, the control 1006 determines whether or not the count has reached "10" (1306). If the answer of the step 1306 is NO, the program returns to the beginning. If the answer of the step 1306 is YES, the control 1006 sees if the black pixel count has been read (1307). If the answer of the step 1307 is NO, the control 1006 reads it (1308) and determines whether or not the count has reached "428" (1309). If the answer of the step 1309 is NO, the program returns to the beginning determining that the page memory of interest is not full. If the answer of the step 1309 is YES, the control 1006 accesses the next memory determining that the page memory is full (1310). Thereafter, the output on the WF gate signal port turns to ZERO (1311) to terminate the image data writing operation to the memory block 1001.

[11]-b Reading Image Data and Controlling Blanking of Lead Edge

By the construction of FIG. 13, the image data is read out and the leading edge portion of the data is blanked, as follows. After a document has been set and the copy start key has been pressed, a paper sheet, not shown, is fed from a paper tray, not shown, selected on the operation board 122 of the operating device 120 at a predetermined timing. As the register sensor, not shown, preceding the register roller, not shown, senses the leading edge of the paper sheet, the write drive control circuit 118 of the writing circuit 111 counts the timing clock generated thereinside and, after a delay necessary for the register, delivers a data request signal to the control 1006. In response, the control 1006 determines whether or not the data request signal has arrived (1312). If the answer of the step 1312 is YES, the output on the RF gate port turns to ONE while the output on the data erase port turns to ZERO (1313). If the answer of the step 1312 is NO, the outputs on the WF gate port and RF gate port both turn to ZERO (1314) and the program returns to the beginning. When the outputs on the RF gate port and data erase port are ONE and ZERO, respectively, the control 1006 determines an amount of the image data to be erased on the basis of the count of black pixels (1315). Thereafter, the control 1006 determines whether or not the ¼ RL sync signal from the timing control 1002 has arrived simultaneously with read processing (1316) and counts the ¼ RL sync signals to supervise the reading condition (1317). Further, the control determines whether or not the above-mentioned count and the amount of erasure are the same as each other (1318). If they compare equal, the control 1006 turns the output on the data erase port to ONE (1319). Specifically, the timing control 1002 generates the ¼ RL sync signals whose interval is associated with the distance of 1 mm as during the writing operation and feeds them to the control 1006. These signals are used as the basis of a data erase signal which will be described. The serial image data outputted by the PS converter 1003 is coupled to one input terminal of the AND gate circuit 1004. Coupled to the other input terminal of the AND gate circuit 1004 is the data erase signal which the controller 1006 generates.

The control 1006 starts counting the ¼ RL sync signals or pulses (each corresponding to 1 mm) on the delivery of the RF gate signal to the timing control 1002 (1317). When the number of ¼ RL sync pulses coincides with the amount of erasure (1318), the output on the data erase port turns to ONE (1319) and, therefore, the output is switched to "H". As a result, the data erase signal is fed to the AND gate circuit 1004 to allow the AND gate 1004 to output the image signal. Stated another way, the AND gate circuit 1004 does not output any image data until the number of ¼ RL sync signals as counted by the control 1006 coincides with the amount of erasure. Hence, no image data is reproduced on a paper sheet to leave the leading edge portion of a paper sheet blank. The relationship of the various signals mentioned above is represented by the waveforms B in FIG. 6.

Assume that the read processing has begun at the address 0. Then, when the count of the ¼ RL sync signals reaches "428" (1320), the control 1006 inhibits any further data from being read out of the page memory and accesses the next page memory (1321). Thereafter, the output on the RF gate signal port turns to ZERO (1322) to terminate the read-out of image data and the blanking control.

The EXOR gate circuit 1005 shown in FIG. 13 is a gate adapted for P/N reversal. The copier is provided with a N/P reversing function thereinside. A negative or a positive output is selectable on the operation panel 122 of the operating device 120. Specifically, a negative output or a positive output is produced when the signal from the control 1006 is "H" or "L".

[12] Construction of Black Pixel Counter II

Figure 17:
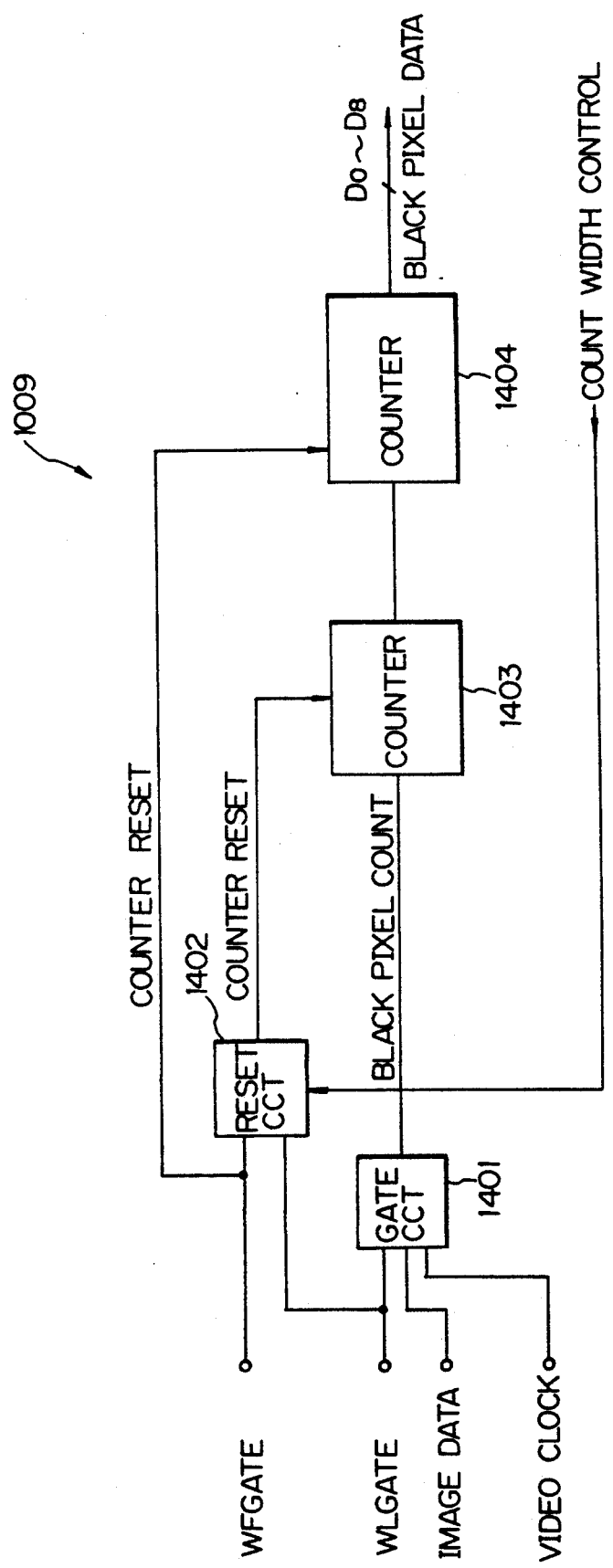
FIG. 17 is a block diagram schematically showing another specific construction of the black pixel counter of FIG. 13.

Another specific construction of the black pixel counter 1009 is shown in FIG. 17. As shown, the black pixel counter 1009 has a gate circuit 1401 to which the image data and video clock signal are fed from the image processing circuit 109. A reset circuit 1402 performs a resetting operation in response to the WF gate signal and WL gate signal as well as to a count width control signal from the control 1006. A counter 1403 receives a black pixel count signal from the gate circuit 1401 and a counter reset signal from the reset circuit 1402. A counter 1404 receives a count signal from the counter 1403 and the FR gate signal and delivers a black pixel data signal $D_0$ to $D_8$ to the control 1006. In the event of data writing, the black pixel counter 1009 causes the above-mentioned counter to count black pixels existing in a portion of an image extending over 10 mm as measured from the leading edge of the image in the subscanning direction, thereby producing an image area density. The count output (black pixel data)

of the black pixel counter 1009 is fed to and held in the control 1006. At the time of read-out, the amount of a blank to be formed on a paper sheet is controlled via the AND gate circuit 1004.

An arrangement is made such that the output of the black pixel counter 1009 is "1" when the area density of black pixels is 1% for a paper width of 210 mm (format A4). One pulse of the L gate signal has a width associated with one line in the main scanning direction, i.e., 9,792 pulses or pixels exist which corresponds to 621.8 mm in terms of the width of a paper sheet. Hence, concerning a paper sheet whose width is 210 mm, the number of pixels is:

$$2792 \times (210/621.8) \approx 3300 \text{ (pixels)}.$$

Therefore, the total number of pixels associated with 10 mm is:

$$3300 \times 8 \times 10 = 264,000 \text{ (pixels)}.$$

1% of such a number of pixels is 2,640 pixels.

By counting black pixels over the distance of 10 mm, causing one pulse to appear for every 2,640 black pixels, and causing another counter to count the pulses, as stated above, it is possible to determine the area density in percentage.

[13] Blanking Operation with Black Pixel Counter II

Figure 18:
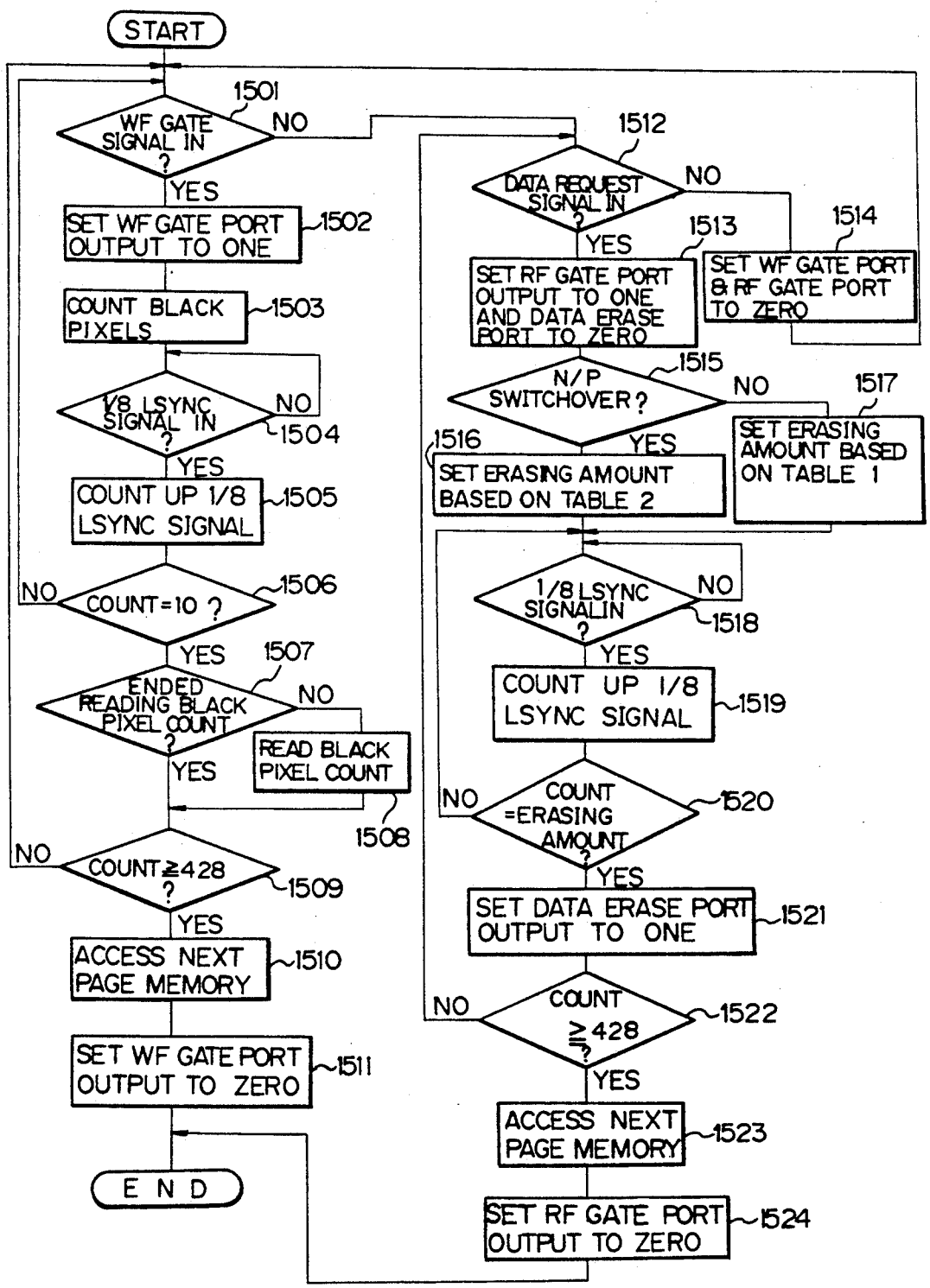
FIG. 18 is a flowchart demonstrating the operation of the image memory shown in FIG. 13.

The operation of the black pixel counter having the above construction will be described with reference to FIGS. 6, 15 and 18. One line of the digital image recording signal from the image processing circuit 109 of the reading device 100 is delayed to reduce the pixel frequency at the time of data transfer, as shown in FIG. 13. Hence, two lines of data are transferred in a period of time associated with two lines. It follows that the digital image recording signal is outputted as the image data 1 and 2 in synchronism with the 16 MHz video clock signal. The SP converter 1000 transforms the digital image recording signal into parallel data and, in synchronism with the address clock produced by dividing the video clock by 32, written to thirty-two memories of the memory block 1001 at the same time. The timing control controls such a writing operation in response to the video clock, the WF gate signal adapted for writing, WL gate signal representative of the width of one line of video clock in the main scanning direction, and pulse-like WL sync signal having a width of eight clock pulses and rising sixteen clock pulses before the WL gate signal for setting up the timing of the WL gate signal. The memory block 1001 is implemented by sixty-four 1-megabit DRAMs thirty-two of which are assigned to the image data 1 and the rest is assigned to the image data 2. The total capacity of the memory block 1001 is 67,108,864 in terms of the number of pixels. The timing control 1002 generates the ⅛ WL sync signal by dividing the WL sync signal by 8 and delivers it to the control 1006. The ⅛ WL sync signal has a pulse interval associated with a distance of about 1 mm in the subscanning direction. By counting the ⅛ WL sync signals, the control 1006 sees the image data writing condition to the memory block 1001. For example, when the control 1006 counts 100⅛ WL sync signals, the image data will have been written to the memory block 1001 over about 100 mm. The relationship of the WF gate signal, image data signal, WL sync signal, WL gate signal and 1/9 WL sync signal to each other is represented by the waveforms A in FIG. 6. When the count of the ⅛ WL sync signals reaches "428", the control 1006 inhibits any further data from being written to the memory block 1001 because the memory block 1001 is full, and starts writing data in the next page memory.

Specifically, in the event of writing, the control 1006 determines whether or not the WF gate signal has arrived (1501). If the answer of the step 1501 is NO, the program is transferred to a reading procedure. If the answer of the step 1501 is YES, the output on the WF gate signal port turns to ONE (1502) and the black pixel counter 1009 counts black pixels included in the image data (1503).

[13]-a Counting Operation

The operation of the black pixel counter 1009 will be described specifically hereinafter. On the change of the WF gate signal (from "L" to "H") which is a write start signal, the counter 1404 is enabled. Also coupled to the reset circuit 1402, the WF gate signal inverts (from "L" to "H") the output of the reset circuit 1402 in response to the first change in the level of the WL gate signal (from "L" to "H") which is indicative of the fact that an image reading operation is under way. This enables the counter 1403.

Only the pulses associated with the black pixels are outputted by the gate circuit 1401 in synchronism with the video clock and fed to the counter 1403. The counter 1403 produces one pulse every time it counts 2,640 pulses. Such output pulses of the counter 1403 are counted by the counter 1404. In parallel with such an operation, the control 1006 counts the ⅛ WL sync signals (each corresponding to 1 mm). When the number of ⅛ WL sync signals coincides with a distance of 10 mm, the control 1006 changes the level of a count width control signal (from "H" to "L") and thereby inverts the output of the reset circuit 1402. As a result, the counter 1403 is disabled and reset. The output of the counter 1404 (black pixel data) is the image area density data and, at this instant, applied to the control 1006.

The relationship of the various signals associated with the black pixel counter 1009 to one another is shown in FIG. 15.

The count (image area density) and the amount of data erasure are controlled as shown in Table 1 when N/P reversal is not effected or as shown in Table 2 below when it is effected.

TABLE 2

| AMOUNT OF ERASURE | COUNT (DOCUMENT: 210 MM WIDE) | COUNT (DOCUMENT: 594 MM WIDE) |
|---|---|---|
| 8 | below 59 H (below 89) | below 109 H (below 265) |
| 5 | 5 AH~5 FH (90~95) | 10 AH~118 H (266~280) |
| 3 | 60 H~61 H (96~97) | 119 H~11 EH (15~29) |
| 0 | above 62 H (above 98) | above 11 F (above 287) |

In Table 2, as in Table 1, The letter H and the parenthesis are representative of hexadecimal notation and decimal notion, respectively.

The counter 1404 is a binary 9-bit counter and, therefore, capable of counting up to "512". Hence, when the paper width is 210 mm, the image area density is up to 512%. For a paper width of 610 mm, the image area density is up to:

$$512 \times (210/610) = 174\%.$$

Specifically, the black pixel counter 1009 is operable with a sufficient margin even when the document has the maximum width and is black over its entire surface (100%). In this case, a prerequisite is that black pixels be countable up to 100% because the output in the N/P inversion mode will be white (amount of data erasure being 0 mm) when the document is black over its entire surface.

The control 1006 determines whether or not the ⅛ WL sync signal has arrived (1504). If the answer of the step 1504 is YES, the control 1006 starts counting the ⅛ WL sync signals (1505). Then, the control 1006 determines whether or not the count has reached "10"(1506). If the answer of the step 1506 is NO, the program returns to the beginning. If the answer of the step 1506 is YES, the control 1006 sees if the black pixel count has been read (1507). If the answer of the step 1507 is NO, the control 1006 reads it (1508) and determines whether or not the count has reached "428"(1509). If the answer of the step 1509 is NO, the program returns to the beginning determining that the page memory of interest is not full. If the answer of the step 1509 is YES, the control 1006 accesses the next memory determining that the page memory is full (1510). Thereafter, the output on the WF gate signal port turns to ZERO (1511) to terminate the image data writing operation to the memory block 1001.

[13]-b Reading Image Data and Controlling Blanking of Lead Edge

The image data is read out and the leadin edge portion of the data is blanked, as follows. After a document has been set and the copy start key has been pressed, a paper sheet, not shown, is fed from a paper tray, not shown, selected on the operation board of the operating device 120 at a predetermined timing. As the register sensor, not shown, preceding the register roller, not shown, senses the leading edge of the paper sheet, the write drive control circuit 118 of the writing circuit 111 counts the timing clock generated thereinside and, after a delay necessary for the register, delivers a data request signal to the control 1006. In response, the control 1006 determines whether or not the data request signal has arrived (1512). If the answer of the step 1512 is YES, the output on the RF gate port turns to ONE while the output on the data erase port turns to ZERO (1513). If the answer of the step 1512 is NO, the outputs on the WF gate port and RF gate port both turn to ZERO (1514) and the program returns to the beginning. Next, the control 1006 determines whether or not N/P reversal has been executed (1515). If the answer of the step 1515 is YES, the control 1006 determines an amount of erasure according to Table 2 (1516); if otherwise, it sets up an amount of erasure according to Table 1 (1517). Thereafter, the control 1006 determines whether or not the ⅛ RL sync signal from the timing control 1002 has arrived simultaneously with read processing (1518) and counts the ⅛ RL sync signals to supervise the reading condition (1519). Further, the control determines whether or not the the above-mentioned count and the amount of erasure are the same as each other (1520). If they compare equal, the control 1006 turns the output on the data erase port to ONE (1512). Specifically, the timing control 1002 generates the ⅛ RL sync signals whose interval is associated with the distance of 1 mm as during the writing operation and feeds them to the control 1006. These signals are used as the basis of a data erase signal which will be described. The serial image data outputted by the PS converter 1003 is coupled to one input terminal of the AND gate circuit 1004. Coupled to the other input terminal of the AND gate circuit 1004 is the data erase signal which the controller 1006 generates.

The control 1006 starts counting the ⅛ RL sync signals or pulses (each corresponding to 1 mm) on the delivery of the RF gate signal to the timing control 1002 (1519). When the number of ⅛ RL sync pulses coincides with the amount of erasure (1520), the output on the data erase port turns to ONE (1521) and, therefore, the output is switched to "H". As a result, the data erase signal is fed to the AND gate circuit 1004 to allow the AND gate 1004 to output the image signal. Stated another way, the AND gate circuit 1004 does not output any image data until the number of ⅛ RL sync signals as counted by the control 1006 coincides with the amount of erasure. Hence, no image data is reproduced on a paper sheet to leave the leading edge portion of a paper sheet blank. The relationship of the various signals mentioned above is represented by the waveforms B in FIG. 6.

Assume that the read processing has begun at the address 0. Then, when the count of the ⅛ RL sync signals reaches "428"(1522), the control 1006 inhibits any further data from being read out of the page memory and accesses the next page memory (1523). Thereafter, the output on the RF gate signal port turns to ZERO (1524) to terminate the read-out of image data and the blanking control.

A prerequisite with the above blanking control procedure using the number of black pixels is that, whether the document be positive or negative, nine bits of data at maximum be fed to the control 1006 in order to count black pixels contained in image data. For example, in the case of a positive document, if the number of black pixels is at least 10% of the entire pixels, it suffices to identify up to 10% of black pixels because the amount of data erasure is constant, i.e. 8 mm. With a document which is 594 mm wide, it suffices to identify 30% of black pixels and, therefore, only five bits, i.e., four bits plus one bit for carry are needed. In image data associated with a negative document, however, black pixels are predominant. Hence, counts up to 100% are necessary resulting in the need for nine bits to accommodate all the data. In the light of this, white pixels are counted in a N/P reversal mode so as to control the amount of data erasure on the basis of the count, while black pixels are counted in a non-N/P reversal mode to control it by using the count. This is successful in reducing the number of bits necessary for the transfer of data to the control 1006 to five.

[14] Construction of Black/White Pixel Counter

Figure 19:
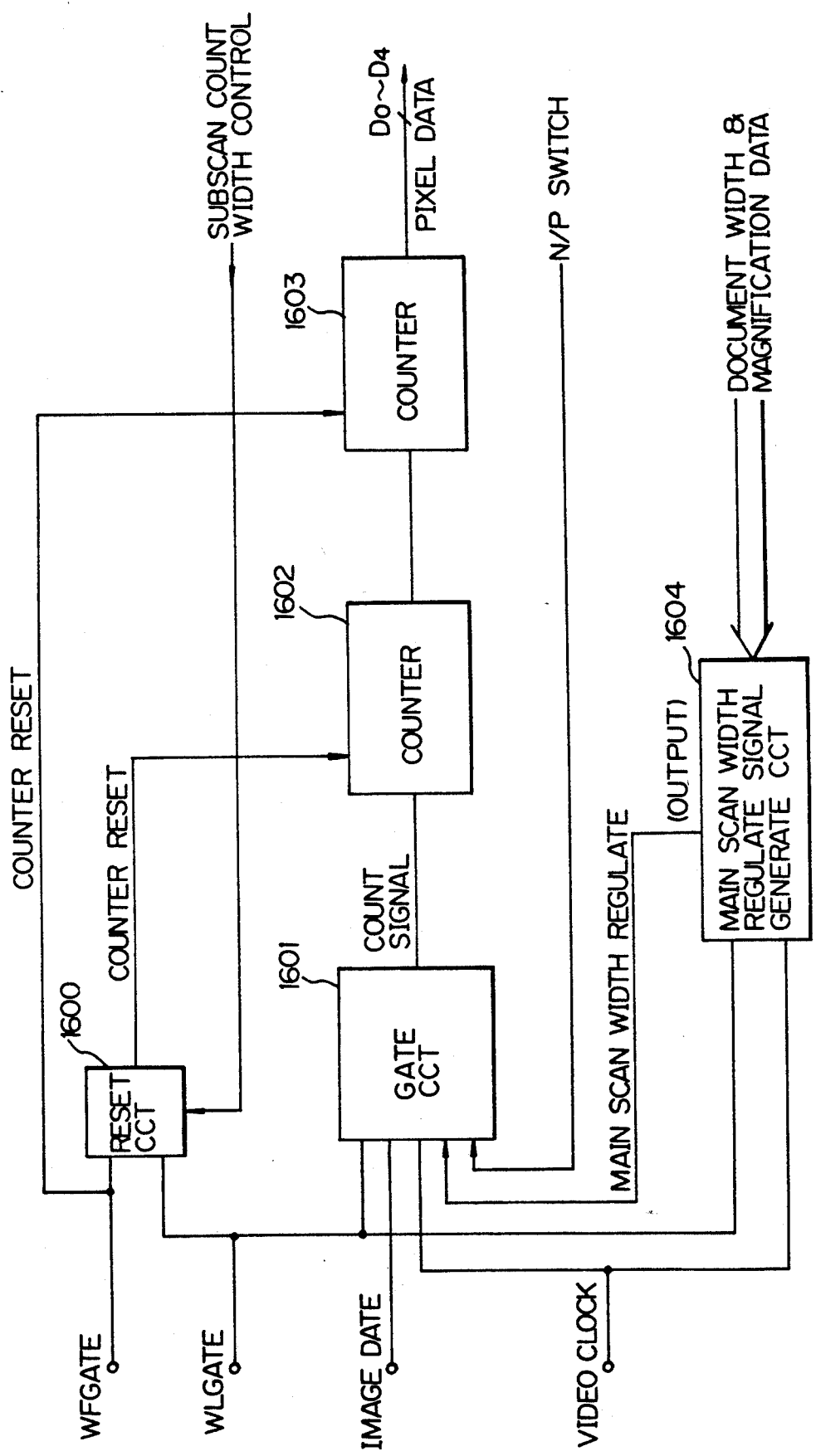
FIG. 19 is a schematic block diagram showing a specific construction of a black/white pixel counter applied to the digital copier of the present invention.

FIG. 19 shows a black/white pixel counter for implementing the above procedure. Specifically, the black/white pixel counter is used in place of the black pixel counter 1009 shown in FIG. 13. The black pixel counter 1009 of FIG. 13 counts, whether or not a N/P reversal signal be indicative of non-reversal (positive) or reversal (negative), only the black pixels. The image area density (count) of 0% to 10% is associated with the amount of data erasure of 0 mm to 8 mm in the non-reversal mode, while the image area density of 100% to 90% is associated with such an amount of data erasure in the reversal mode.

As shown in FIG. 19, the black/white pixel counter has a reset circuit 1600 for performing a resetting operation in response to the WF gate signal and WL gate signal as well as to a subscan count width control signal which is generated by the control 1006. A gate circuit 1601 produces a count signal in response the WL gate signal and a N/P switching signal and a main scan width control signal which are also generated by the control 1006. A counter 1602 performs a resetting operation in response to the count signal from the gate circuit 1601 and a reset signal from he reset circuit 1600. A counter 1603 delivers pixel data $D_0$ to $D_4$ to the control 1006 in response to the count signal from the counter 1602 and the reset signal. A main scan width regulating signal generating circuit 1604 produces a main scan width regulating signal in response to the WL gate signal and video clock as well as to document width data and magnification data, the regulating signal being fed to the gate circuit 1601.

[15] Operation of Black/White Pixel Counter

Figure 20:
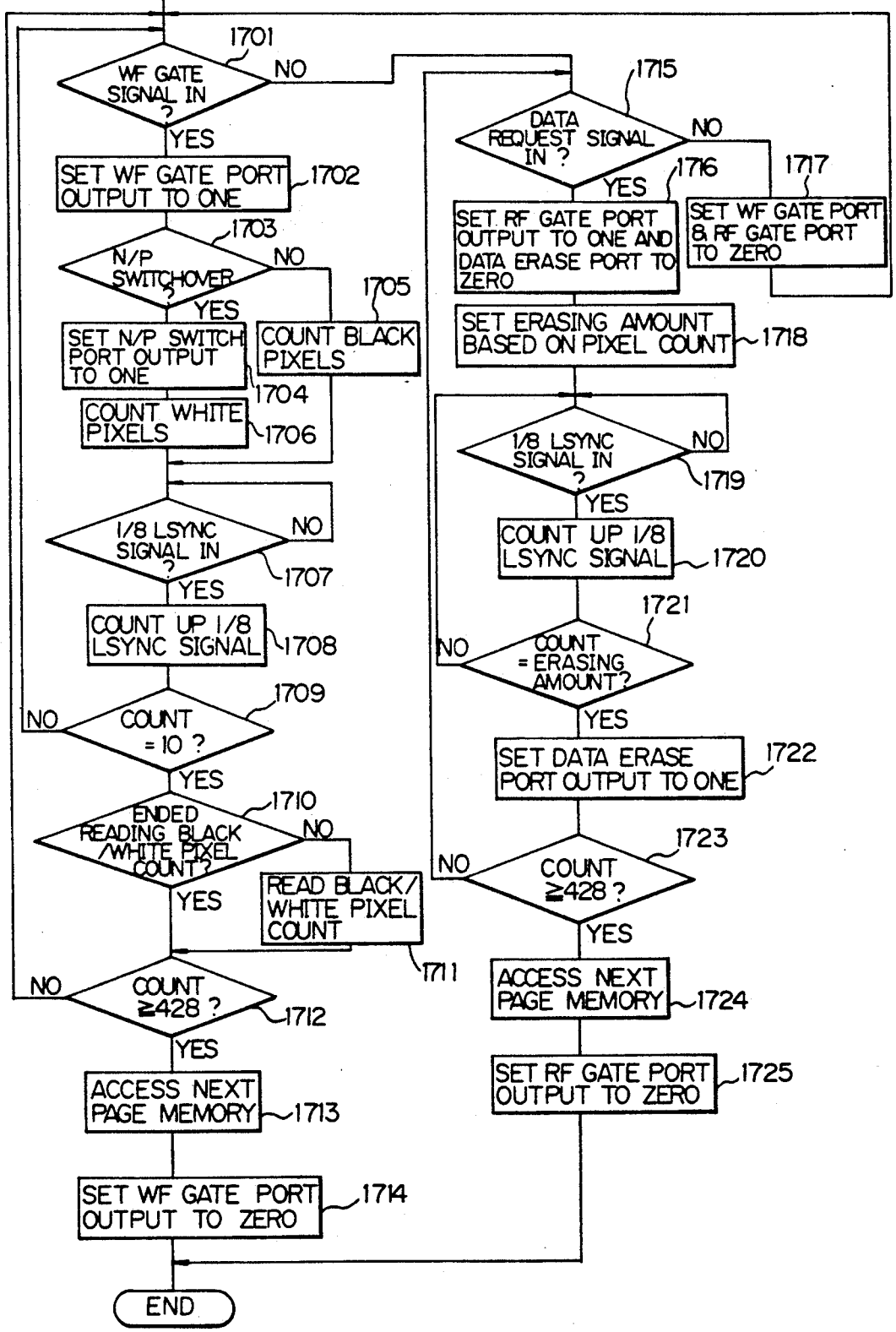
FIG. 20 is a flowchart indicative of the operation of the image memory shown in FIG. 13 which is combined with the black/white pixel counter of FIG. 19.

The operation of the black/white pixel counter will be described with reference to FIG. 20. In the event of data writing, the control 1006 determines whether or not the WF gate signal has arrived (1701). If the answer of the step 1701 is NO, the program is transferred to a reading procedure. If the answer of the step 1701 is YES, the output on the WF gate signal port turns to ONE (1702). Then, the control 1006 determines whether or not N/P reversal has been executed (1703). If the answer of the step 1703 is YES, the output on a negative-positive conversion port turns to ONE (1704) so that the control 1006 counts white pixels; if otherwise, the control 1006 counts black pixels (1705).

[15]-a Counting Operation

In response to the N/P switching signal from the control 1006, the gate circuit 1601 produces a black pixel count signal in a non-reversal mode or a white pixel count signal in a reversal mode. Since the white pixel count signal is the inverted black pixel count signal, the image area density (count) associated with the amount of data erasure of 0 mm to 8 mm is 0% to 10% with no regard to reversal/non-reversal. For this reason, when paper widths up to 610 mm are taken into account, the maximum count of the counter 1603 does not have to be greater than "30". This reduces the number of required data lines to the counters 1602 and 1603 and the control 1006. The counter 1603 (binary 5-bit counter) counts up to "32" and, therefore, has five data lines. In the event when white pixels are counted, a document feed roller installed in the reading section and colored in white causes white data to appear except for the document width and thereby prevents pixel data from being read with accuracy. To eliminate this problem, the main scan width regulating signal generating circuit 1604 is loaded with a document width and, at the outside of the particular width, produces a main scan width regulating signal to thereby inhibit the gate circuit 1601 from outputting a count signal.

The gate circuit 1601 selects either one of the white pixel count signal and black pixel count signal in response to the level ("L" or "H") of the N/P switching signal which is fed thereto from the control 1006.

On the change in the level of the WF gate signal (from "L" to "H"), the counter 1603 is enabled. As the WL gate signal undergoes a transition (from "L" to "H") for the first time, the output of the reset circuit 1600 is inverted (from "L" to "H") to enable the counter 1602. At the same time, in response to a change in the WL gate signal (from "L" to "H"), the gate signal 1601 delivers either the white pixel or black pixel count signal in synchronism with the video clock. The pixel count signal in applied to the counter 1602. The counter 1602 generates one pulse every time it counts 2,650 pulses, while the counter 1603 counts the output pulses of the counter 1602.

When the reading section is brought to the outside of the specified document width while the N/P switching signal is in "H" designating white pixels, the output of the regulating signal generating circuit 1604 changes in level (from "H" to "L") to thereby interrupts the output of the gate circuit 1601. As a result, undesired white pixels are omitted. When the document is read over 10 mm in the subscanning direction, the control 1006 sends a subscan count width control signal to the reset circuit 1600 and thereby inverts the output of the latter. Then, the counter 1602 is disabled and reset. The output of the counter 1603 (pixel data) is the image area density data and, at this instant, fed to the control 1006. The amount of a blank is controlled according to Table 1 or 2. Specifically, since the correspondence between the count and the amount of data erasure remains the same with no regard to the state of the N/P switching signal, it suffices to use Table 2.

Subsequently, the control 1006 determines whether or not the ¼ WL sync signal has arrived (1707). If the answer of the sep 1707 is YES, the control 1006 starts counting the ¼ WL sync signals (1708). Then, the control 1006 sees if the count has reached "10" (1709). If the answer of the step 1709 is NO, the program returns to the beginning; if otherwise, the control 1006 determines whether or not the count of black pixels or that of white pixels has been read (1710). If the answer of the step 1710 is NO, the control 1006 reads the count (1711). Subsequently, the control 1006 determines whether or not the count has reached "428" (1712). If the answer of the step 1712 is NO, the program returns to the beginning determining that the page memory of interest is not full; if otherwise, the program accesses the next page memory determining that the page memory of interest is full (1713). Thereafter, the output on the WF gate signal port turns to ZERO (1714), and the writing operation to the memory block 1001 is terminated.

[15]-b Reading Image Data and Controlling Blanking of Lead Edge

By the construction of FIG. 13 and the above-stated black/white pixel counter, the image data is read out and the leading edge portion of the data is blanked, as follows. After a document has been set and the copy start key has been pressed, a paper sheet, not shown, is fed from a paper tray, not shown, selected on the operation board of the operating device 120 at a predetermined timing. As the register sensor, not shown, preceding the register roller, not shown, senses the leading edge of the paper sheet, the write control circuit 118 of the writing circuit 111 counts the timing clock generated thereinside and, after a delay necessary for the register, delivers a data request signal to the control 1006. In response, the control 1006 determines whether or not the data request signal has arrived (1715). If the answer of the step 1715 is YES, the output on the RF gate port turns to ONE while the output on the data erase port turns to ZERO (1716). If the answer of the step 1715 is NO, the outputs on the WF gate port and RF gate port both turn to ZERO (1717) and the program returns to the beginning. Then, the control 1006 sets up an amount of erasure associated with the count of pixels (1718).

Thereafter, the control 1006 determines whether or not th ¼ RL sync signal from the timing control 1002 has arrived simultaneously with read processing (1719) and counts the ⅛ RL sync signals to supervise the reading condition (1720). Further, the control 1006 determines whether or not the above-mentioned count and the amount of erasure are the same as each other (1721). If they compare equal, the control 1006 turns the output on the data erase port to ONE (1722). Assume that the read processing has begun at the address 0. Then, when the count of the ⅛ RL sync signals reaches "428" (1723), the control 1006 inhibits any further data from being read out of the page memory and accesses the next page memory (1724). Thereafter, the output on the RF gate signal port turns to ZERO (1725) to terminate the readout of image data and the blanking control.

[16] Timing for Counting Pixels

While the construction shown and described counts pixels representative of a document when the count is written to the memory block, an arrangement may be so made as to count pixels within the reading device. Such an alternative scheme is practicable by feeding the count of pixels to the copier after coding it. Further, while the pixels may be counted at the time of data read-out from the memory block, the signal will undesirably be fed to the writing device also. This problem will be eliminated if a sequence of steps of delaying the output of the signal to the writing device by one line, counting pixels, and then inhibiting the output of data if the count is greater than a predetermined count are executed over 8 mm as measured from the leading edge.

[17] Other operations with Image Memory IV

Figure 21A:
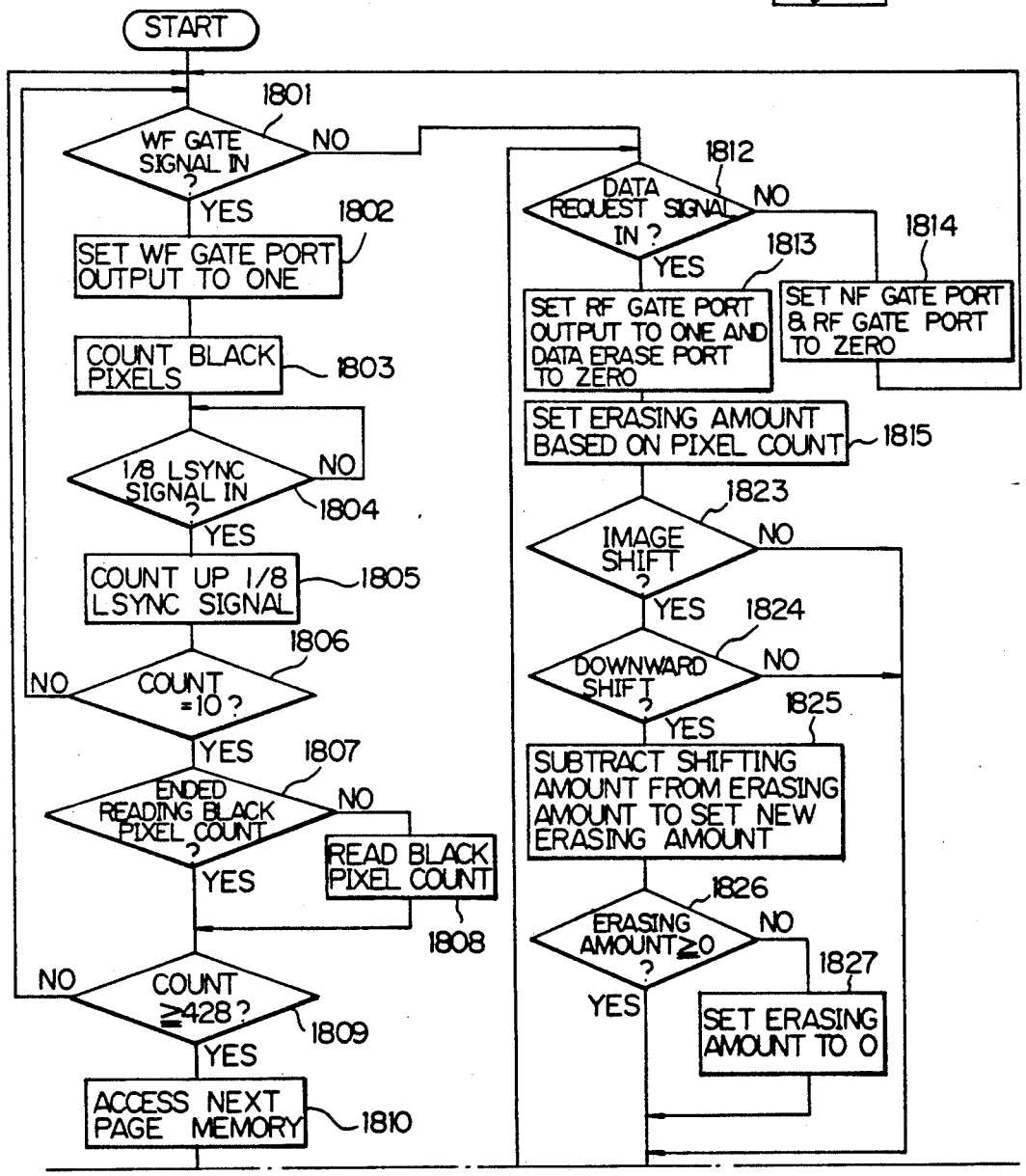
FIGS. 21A and 21B are flowchart representative of an alternative embodiment of the digital copier in a accordance with the present invention which is based on the construction of FIG. 13.
Figure 21B:
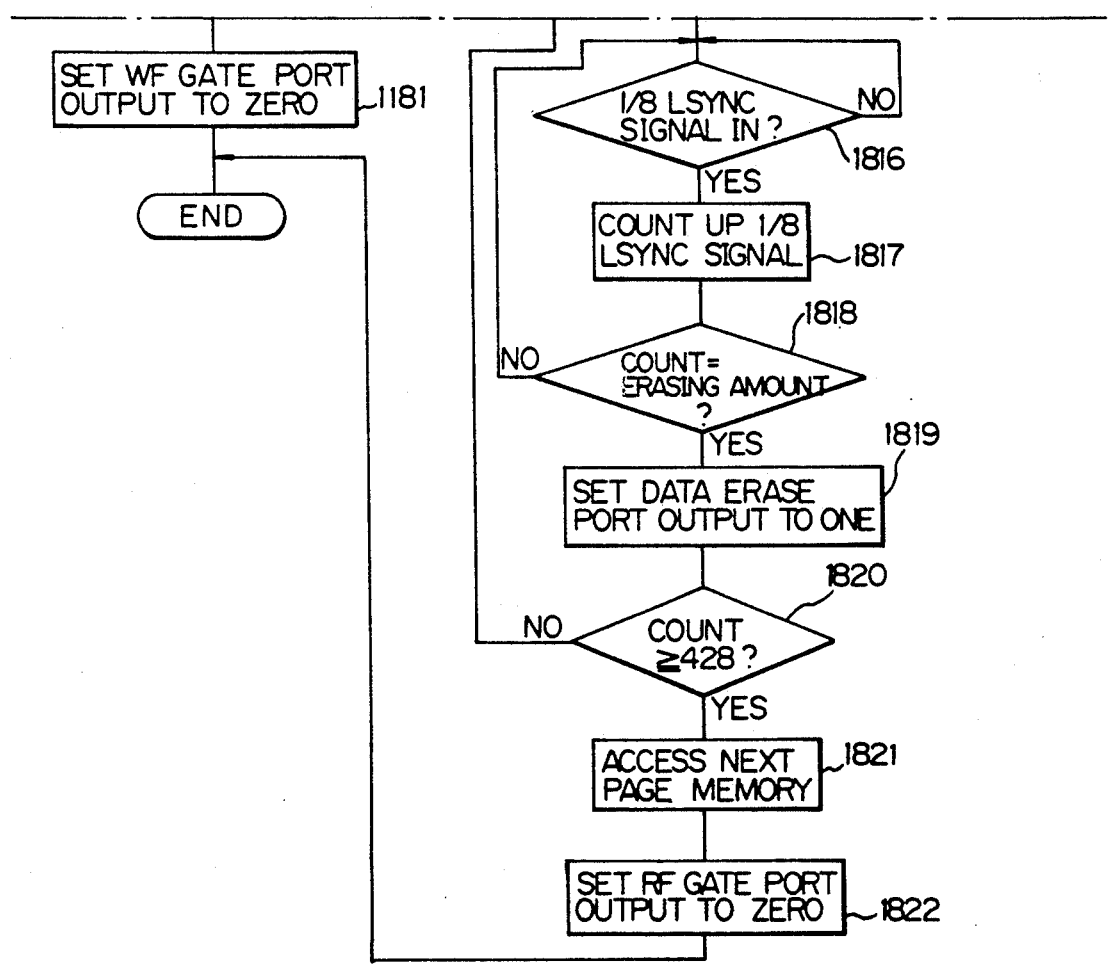

Other operations available with the image memory shown in FIG. 13 will be described with reference to FIG. 21. One line of the digital image recording signal from the image processing circuit 109 of the reading device 100 is delayed to reduce the pixel frequency at the time of data transfer, as shown in FIG. 13. Hence, two lines of data are transferred in a period of time associated with two lines. It follows that the digital image recording signal is outputted as the image data 1 and 2 in synchronism with the 16 MHz video clock signal. The SP converter 1000 transforms the digital image recording signal into parallel data. The parallel data are written to thirty-two page memories of the memory block 1001 at the same time in synchronism with the address clock produced by dividing the video clock by 32. The timing control 1002 controls such a writing operation in response to the video clock, WF gate signal adapted for writing, WL gate signal representative of the width of one line of video clock in the main scanning direction, and pulse-like WL sync signal having a width of eight clock pulses and rising sixteen clock pulses before the WL gate signal for setting up the timing of the WL gate signal. The memory block 1001 is implemented by sixty-four 1-megabit DRAMs thirty-two of which are assigned to the image data 1 and the rest is assigned to the image data 2. The total capacity of the memory block 1001 is 67,108,864 in terms of the number of pixels. The timing control 1002 generates the ⅛ WL sync signal by dividing the WL sync signal by 8 and delivers it to the control 1006. The ⅛ WL sync signal appears once for every eight WL signals and has a pulse interval associated with a distance of about 1 mm in the subscanning direction. By counting the ⅛ WL sync signals, the control 1006 sees the image data writing condition to the memory block 1001. For example, when the control 1006 counts 100⅛ WL sync signals, the image data will have been written to the memory block 1001 over about 100 mm. The relationship of the WF gate signal, image data signal, WL sync signal, WL gate signal and 1/9 WL sync signal to one another is represented by the waveforms A in FIG. 6. When the count of the ⅛ WL sync signals reaches "428", the control 1006 inhibits any further data from being written to the memory block 1001 because the memory block 1001 is full, and starts writing data in the next page memory.

Specifically, in the event of writing, the control 1006 determines whether or not the WF gate signal has arrived (1801). If the answer of the step 1801 is NO, the program is transferred to a reading procedure. If the answer of the step 1801 is YES, the output on the WF gate signal port turns to ONE (1802) and the black pixel counter 1009 counts black pixels included in the image data (1803).

[17]-a Operation of Black Pixel Counter

The operation of the black pixel counter 1009 will be described specifically with reference to FIG. 14. On the change of the WF gate signal (from "L" to "H") which is a write start signal, the counter 1104 is enabled. Also coupled to the reset circuit 1102, the WF gate signal inverts (from "L" to "H") the output of the reset circuit 1102 in response to the first change in the level of the WL gate signal (from "L" to "H") which is indicative of the fact that an image reading operation is under way. This enables the counter 1103.

Only the pulses associated with the black pixels are outputted by the gate circuit 1101 in synchronism with the video clock and fed to the counter 1103. The counter 1103 produces one pulse every time it counts 2,640 pulses. Such output pulses of the counter 1103 are counted by the counter 1104. In parallel with such an operation, the control 1006 counts the ⅛ WL sync signals (each corresponding to 1 mm). When the number of ⅛ WL sync signals coincides with a distance of 10 mm, the control 1006 changes the level of a count width control signal (from "H" to "L") and thereby inverts the output of the reset circuit 1102. As a result, the counter 1103 is disabled and reset. The output of the counter 1104 (black pixel data) is the image area density data and, at this instant, applied to the control 1006.

The relationship of the various signals associated with the black pixel counter 15 to one another is shown in FIG. 15.

The count and the amount of data erasure are controlled as described with reference to Table 1 earlier.

The counter 1104 is a binary 8-bit counter and, therefore, capable of counting up to "256" which is associated with 256%. When the paper width is 210 mm, 10 mm contains 264,000 pixels in total. Hence, assuming that all the 264,000 pixels are black pixels, the count is 264,000/2640 = "100". Assuming that the maximum width of documents is 610 mm, then the total number of pixels is about 2.9 times greater and, if all of them are black pixels, the count is "290". Since the maximum count available with the counter 1104 is "256", up to 88% of the image area density can be counted, i.e. 256/290 = 0.88. Since the image area density is based on the paper width of 210 mm as mentioned above, the image density associated with a paper width of 420 mm is one half the count. Likewise, when the paper width is 594 mm which may be regarded to be approximately three times the width of 210 mm, the image area density will be one-third of the count.

The control 1006 determines whether or not the ⅛ WL sync signal has arrived (1804). If the answer of the step 1804 is YES, the control 1006 starts counting the ⅛ WL sync signals (1805). Then, the control 1006 determines whether or not the count has reached "10"(1806). If the answer of the step 1806 is NO, the program returns to the beginning. If the answer of the step 1806 is YES, the control 1006 sees if the black pixel count has been read (1807). If the answer of the step 1807 is NO, the control 1006 reads it (1808) and determines whether or not the count has reached "428"(1809). If the answer of the step 1809 is NO, the program returns to the beginning determining that the page memory of interest is not full. If the answer of the step 1809 is YES, the control 1006 accesses the next memory determining that the page memory is full (1810). Thereafter, the output on the WF gate signal port turns to ZERO (1811) to terminate the image data writing operation to the memory block 1001.

[17]-b Readubg Image Data and Controlling Blanking of Lead Edge

By the construction of FIG. 13, the image data is read out and the leading edge portion of the data is blanked, as follows. After a document has been set and the copy start key has been pressed, a paper sheet, not shown, is fed from a paper tray, not shown, selected on the operation board 122 of the operating device 120 at a predetermined timing. As the register sensor, not shown, preceding the register roller, not shown, senses the leading edge of the paper sheet, the write drive control circuit 118 of the writing circuit 111 counts the timing clock generated thereinside and, after a delay necessary for the register, delivers a data request signal to the control 1006. In response, the control 1006 determines whether or not the data request signal has arrived (1812). If the answer of the step 1812 is YES, the output on the RF gate port turns to ONE while the output on the data erase port turns to ZERO (1813). If the answer of the step 1812 is NO, the outputs on the WF gate port and RF gate port both turn to ZERO (1814) and the program returns to the beginning. When the outputs on RF gate port and data erase port are ONE and ZERO, respectively, the control 1006 determines an amount of the image data to be erased on the basis of the count of black pixels (1815). Thereafter, the control 1006 determines whether or not an image shift is to be executed (1823). If the answer of the step 1823 is YES, the control 1006 determines whether the image shift is downward (1824). If the answer of the step 1824 is YES, the control 1006 subtracts the amount of shift from the amount of erasure to produce a new amount of erasure (1825). Further, the control 1006 sees if the amount of erasure is equal to or greater than zero (1826) and, if the answer is NO, sets an amount of erasure which is zero (1827). If the answer of the step 1823 or that of the step 1824 is NO or if the answer of the step 1826 is YES, the program executes the following steps.

Specifically, the control 1006 determines whether or not the ¼ RL sync signal from the timing control 1002 has arrived simultaneously with read processing (1816) and counts the ¼ RL sync signals to supervise the reading condition (1817). Further, the control 1006 determines whether or not the above-mentioned count and the amount of erasure are the same as each other (1818). If they compare equal, the control 1006 turns the output on the data erase port to ONE (1819). Specifically, the timing control 1002 generates the ¼ RL sync signals whose interval is associated with the distance of 1 mm as during the writing operation and feeds them to the control 1006. These signals are used as the basis of a data erase signal which will be described. The serial image data outputted by the PS converter 1003 is coupled to one input terminal of the AND gate circuit 1004. Coupled to the other input terminal of the AND gate circuit 1004 is the data erase signal which the controller 1006 generates.

The control 1006 starts counting the ¼ RL sync signals or pulses (each corresponding to 1 mm) on the delivery of the RF gate signal to the timing control 1002 (1817). When the number of ¼ RL sync pulses coincides with the amount of erasure (1818), the output on the data erase port turns to ONE (1819) and, therefore, the output is switched to "H". As a result, the data erase signal is fed to the AND gate circuit 1004 to allow the AND gate 1004 to output the image signal. Stated another way, the AND gate circuit 1004 does not output any image data until the number of ¼ RL sync signals as counted by the control 1006 coincides with the amount of erasure. Hence, no image data is reproduced on a paper sheet to leave the leading edge portion of the paper sheet blank. The relationship of the various signals mentioned above is represented by the waveforms B in FIG. 6.

Assume that the read processing has begun at the address 0. Then, when the count of the ¼ RL sync signals reaches "428"(1820), the control 1006 inhibits any further data from being read out of the page memory and accesses the next page memory (1821). Thereafter, the output on the RF gate signal port turns to ZERO (1822) to terminate the read-out of image data and the blank control.

The EXOR gate circuit 1005 shown in FIG. 13 is a gate adapted for N/P reversal. The copier is provided with a N/P reversing function thereinside. A negative or a positive output is selectable on the operation panel 122 of the operating device 120. Specifically, a negative output or a positive output is produced when the signal from the control 1006 is "H" or "L".

[18] Image Shift

The shift of an image may be effected in any one of four directions, i.e., rightward, leftward, forward and rearward by manipulating switches which are provided on the operation board 122. When an image is shifted downward in order to produce a leading edge portion of an image, the amount of shift is subtracted from the amount of data erasure. For example, when an image is shifted by 3 mm downward, the amount of data erasure is reduced by 3 mm so that, in the case of counts 3H to 4H (associated with document width of 210 mm) shown in Table 1, the omission of an image in the leading edge portion is zero. When the image is shifted by 8 mm downward, no images are omitted with no regard to the image density. So long as the amount of image shift is 5 mm or so, no problem arises because a margin of 7 mm to 8 mm is usually left around a document. In a copier of the type using a roll of paper sheet, the paper sheet will be cut at a usual length plus the amount of image shift. When an image is shifted upward, the leading edge portion of a paper sheet is left blank over a predetermined width without exception because the amount of data erasure associated zero image shift is applied.

[19] Entry of Paper Conditions

The operation board 122 of the operating device 120 is also accessible for entering various conditions particular to paper sheets, e.g. thickness, kind and straining direction. This, combined with the black pixel data contained in the image data, further promotes adequate blanking control. For example, when use is made of thin paper sheets which lack elasticity or paper sheets stained widthwise, the blanking width may be increased. Conversely, when thick and elastic paper sheets or paper sheets strained lengthwise are used, the blanking width may be decreased because paper sheets of this kind rarely wrap round a fixing roller. Such control further enhances the stable transport of a paper sheet.

In summary, the present invention provides a digital copier which has erasing means for erasing digital image data over a predetermined area in the subscanning direction. The copier, therefore, forms a blank area in a leading edge portion of a paper sheet with accuracy to prevent the paper sheet from coiling round a fixing roller, whereby a fixing device is freed from paper jams.

The copier also has means for changing the set value of the erasing means. Specifically, the set value of the erasing means is variable depending on whether or not P/N reversal is effected so as to change the area where the image data is to be erased. This is successful in eliminating short blanking of the leading edge portion of a paper sheet due to the switchover to the output of a positive image, thereby preventing a paper sheet from wrapping round a fixing roller.

The erasing means is controlled on the basis of black pixel data included in the image data and data associated with paper sheets. A blank are is formed accurately in matching relation to the image data or to the conditions of paper sheets, whereby a paper sheet is prevented from wrapping round a fixing roller and, therefore, jamming a fixing device.

The area where the image data is to be erased by the erasing means is controlled on the basis of the count of black pixel images included in the image data and produced by counting means in association with the reversal processing of reversing means. Hence, the blanking area is variable on the basis of the reversal to prevent a paper sheet from wrapping round a fixing roller and, therefore, from jamming a fixing device. Also, image data locate at a leading edge portion of a paper sheet and which does not need blanking control is left on the paper sheet.

Further, the area to be erased by the erasing means is controlled in response to the number of black pixels and the number of white pixels counted by the counting means. This minimizes the amount of data to be transferred and thereby simplifies the copier construction.

Due to the previously stated control over the erasing means, a blank is formed accurately in a leading edge portion of a paper sheet in matching relation to the image data or the conditions of paper sheets. A paper sheet is, therefore, prevented from wrapping round a fixing roller and, therefore, from jamming a fixing device. Such control may be combined with the shift of an image to eliminate the omission of an image in a leading edge portion of a paper sheet.

Various modifications will become possible for those skilled in the art after receiving the teachings of the present disclosure without departing from the scope thereof.

What is claimed is:

1. A digital copier for transferring an image formed on a photoconductive element by digitally processing a document image and fixing the image on a paper sheet, the digital copier comprising:
   image reading means for converting the document image into a multi-level density signal by a photoelectric conversion device;
   converting means for converting the multi-level density signal from said image reading means into digital image data;
   storing means for storing the digital image data from said converting means;
   image forming means for reading the digital image data out of said storing means to form an image based on the image data on the photoconductive element;
   transferring means for transferring the image formed by said image forming means to the paper sheet being transported;
   erasing means for erasing the digital image data over a predetermined area in a subscanning direction; and
   a counter providing a numerical value indicating a number of black pixels in a predetermined range included in the digital image data along a leading edge of the document, the digital image data being erased by the erasing means when the number of black pixels counted is greater than a predetermined value.

2. A copier as claimed in claim 1, wherein the area where the digital image data is to be erased by said erasing means is controlled on the basis of a count outputted by said counter.

3. A copier as claimed in claim 1, wherein the area where the digital image data is to be erased by said erasing means is controlled on the basis of a count outputted by said counter and entered conditions particular to the paper sheet.

4. A digital copier for transferring an image formed on a photoconductive element by digitally processing a document image and fixing the image on a paper sheet, the digital copier comprising:
   image reading means for converting the document image into a multi-level density signal by a photoelectric conversion device;
   converting means for converting the multi-level density signal from said image reading means into digital image data;
   storing means for storing the digital image data from said converting means;
   image forming means for reading the digital image data out of said storing means to form an image based on the image data on the photoconductive element;
   transferring means for transferring the image formed by said image forming means to the paper sheet being transported;
   erasing means for erasing the digital image data over a predetermined area in a subscanning direction;
   image reversing means for inverting polarity of the digital image data; and
   counting means for counting black pixels in a predetermined range included in the digital image data along a leading edge of the document, the digital image data being erased by the erasing means when the number of black pixels counted is less than a predetermined value.

5. A copier as claimed in claim 4, wherein the area where the image area is to be erased by said erasing means is controlled on the basis of a count representative of a number of the black pixels and outputted by said counting means in association with image reversal processing which is executed by said image reversing means.

6. A copier as claimed in claim 5, wherein said counting means counts the black pixels when the digital image data is written to said storing means, erasure of the digital image data by said erasing means being executed when the digital image data is read out of said storing means.

7. A digital copier for transferring an image formed on a photoconductive element by digitally processing a document image and fixing the image on a paper sheet, the digital copier comprising:

- image reading means for converting the document image into a multi-level density signal by a photoelectric conversion device;
- converting means for converting the multi-level density signal from said image reading means into digital image data;
- storing means for storing the digital image data from said converting means;
- image forming means for reading the digital image data out of said storing means to form an image based on the image data on the photoconductive element;
- transferring means for transferring the image formed by said image forming means to the paper sheet being transported;
- erasing means for erasing the digital image data over a predetermined area in a subscanning direction;
- image reversing means for inverting polarity of the digital image data; and
- counting means, (1) in the event of no image reversal, for counting black pixels in a predetermined range included in the digital image data along a leading edge of the document, the digital image data being erased by the erasing means when the number of black pixels counted is greater than a predetermined value, and (2) in the event of image reversal, for counting white pixels in a predetermined range included in the digital image data along a leading edge of the document, the digital image data being erased by the erasing means when the number of white pixels counted is greater than a predetermined value.

8. A copier as claimed in claim 7, wherein the area where the digital image data is to be erased by said erasing means is controlled on the basis of counts representative of a number of black pixels and a number of white pixels and output by said counting means in association with polarity inversions of the image executed by said image reversing means.

9. A digital copier for transferring an image formed on a photoconductive element by digitally processing a document image and fixing the image on a paper sheet, the digital copier comprising:

- image reading means for converting the document image into a multi-level density signal by a photoelectric conversion device;
- converting means for converting the multi-level density signal from said image reading means into digital image data;
- storing means for storing the digital image data from said converting means;
- image forming means for reading the digital image data out of said storing means to form an image based on the image data;
- erasing means for erasing the digital image data over a predetermined area in a subscanning direction when said image forming means forms an image;
- shifting means for shifting the digital image data in position in the subscanning direction when the digital image data is read out of said storing means;
- shift setting means for setting an amount of shift by which the image data is to be shifted by said shifting means; and
- transferring means for transferring the image formed by said image forming means to the paper sheet being transported;
- an amount of erasure by which the digital image data is to be erased in a leading edge portion of the image by said erasing means being varied on the basis of the amount of shift of the digital image data determined by said shift setting means.

10. A copier as claimed in claim 9, wherein when the digital image data is shifted in an advancing direction with respect to image transfer, the amount of erasure by said erasing means is confined to a predetermined range so that the digital image data is controlled in a retarding direction than the paper sheet;

when a value produced by subtracting the amount of shift from the amount of erasure is greater than zero, the amount of erasure is controlled on the basis of said value while, when said value is smaller than zero, the amount of erasure is determined to be zero.

* * * * *